United States Patent
Zhao et al.

(10) Patent No.: US 9,566,576 B2
(45) Date of Patent: Feb. 14, 2017

(54) METAL COMPLEX CATALYSTS AND USES THEREOF

(71) Applicant: University of Memphis Research Foundation, Memphis, TN (US)

(72) Inventors: Xuan Zhao, Memphis, TN (US); Charles E. Webster, Memphis, TN (US)

(73) Assignee: The University of Memphis Research Foundation, Memphis, TN (US)

( * ) Notice: Subject to any disclaimer, the term of this patent is extended or adjusted under 35 U.S.C. 154(b) by 272 days.

(21) Appl. No.: 14/449,100

(22) Filed: Jul. 31, 2014

(65) Prior Publication Data

US 2015/0021197 A1 Jan. 22, 2015

Related U.S. Application Data

(63) Continuation-in-part of application No. 13/867,992, filed on Apr. 22, 2013, now abandoned.

(60) Provisional application No. 61/860,889, filed on Jul. 31, 2013, provisional application No. 61/636,704, filed on Apr. 22, 2012.

(51) Int. Cl.
*C25B 1/04* (2006.01)
*B01J 31/18* (2006.01)
*B01J 31/22* (2006.01)
*C25B 11/04* (2006.01)
(Continued)

(52) U.S. Cl.
CPC ......... *B01J 31/1815* (2013.01); *B01J 31/2295* (2013.01); *C01B 3/02* (2013.01); *C25B 1/003* (2013.01); *C25B 1/04* (2013.01); *C25B 11/0447* (2013.01); *B01J 2531/845* (2013.01); *Y02E 60/366* (2013.01)

(58) Field of Classification Search
CPC .... B01J 31/1815; B01J 31/2295; C25B 1/003; C25B 1/04
See application file for complete search history.

(56) References Cited

U.S. PATENT DOCUMENTS

| | | | |
|---|---|---|---|
| 2008/0308407 A1* | 12/2008 | Rostovtsev | C01B 3/042 204/157.47 |
| 2011/0042227 A1* | 2/2011 | Corbea | B01J 31/16 205/340 |
| 2013/0181174 A1* | 7/2013 | Pan | C07F 15/0033 252/519.2 |

OTHER PUBLICATIONS

Zhang ("Electrocatalytic hydrogen evolution from neutral water by molecular cobalt tripyridine-diamine complexes," Chem. Commun., 2013, 49, p. 9455)—published Jul. 8, 2013.*

(Continued)

*Primary Examiner* — Nicholas A Smith
(74) *Attorney, Agent, or Firm* — Mintz Levin Cohn Ferris Glovsky and Popeo, P.C.; Peter F. Corless; Carolina E. Säve

(57) ABSTRACT

The invention relates to novel metal complexes useful as catalysts in redox reactions (such as, hydrogen ($H_2$) production). In particular, the invention provides novel transition metal (e.g., cobalt (Co) or nickel (Ni)) complexes, in which the transition metal is coupled with N,N-Bis(2-pyridinylmethyl)-2,2'-Bipyridine-6-methanamine (DPA-Bpy), 6'-((bis(pyridin-2-ylmethyl)amino)methyl)-N,N-dimethyl-2,2'-bipyridin-6-amine (DPA-ABpy), N,N-bis((isoquinolin-1-yl)methyl)(6-(pyridin-2-yl)pyridin-2-yl)methanamine (DIQ-Bpy), or a derivative thereof. The invention also relates to a method of producing $H_2$ from an aqueous solution by using the metal complex as a catalyst. In certain embodiments, the invention provides a metal complex of the formulae as described herein.

20 Claims, 22 Drawing Sheets

DFT Optimized Structure of the Cationic Moiety of 5, Color code: light blue, Ru; blue, N; red, O; gray, C; white, H.

(51) Int. Cl.
*C01B 3/02* (2006.01)
*C25B 1/00* (2006.01)

(56) References Cited

OTHER PUBLICATIONS

Radaram ("Water oxidation by mononuclear ruthenium complexes with TPA-based ligands," Inorganic Chemistry, 2011, 50, pp. 10564-10571).*

* cited by examiner

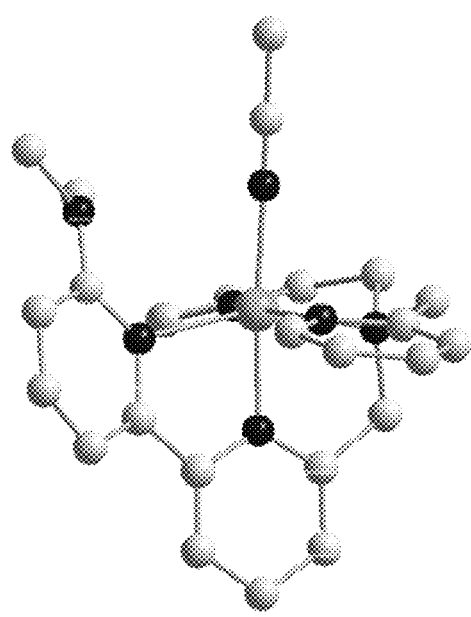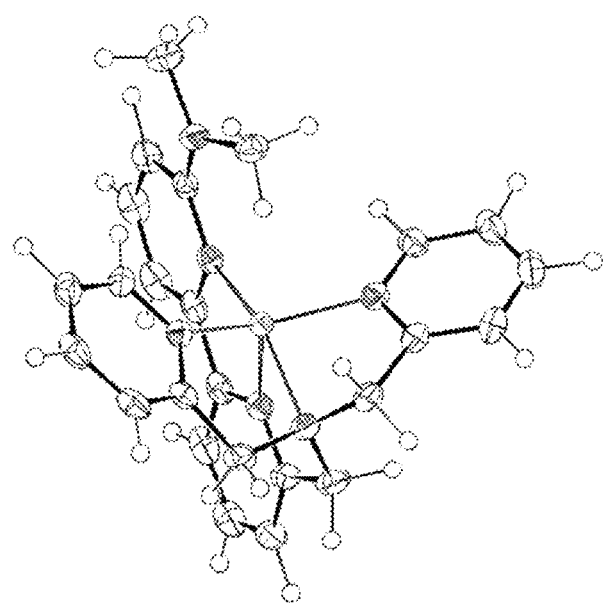
(a)                                 (b)
FIG. 18 a-b

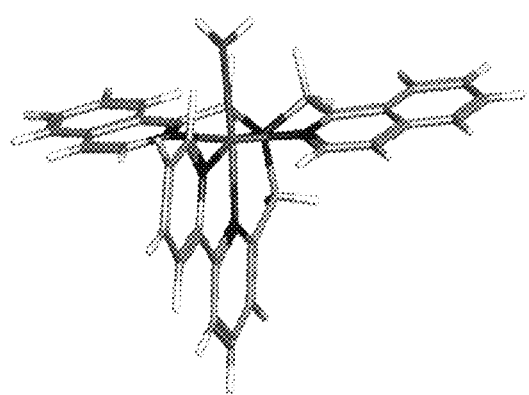
Figure 19. DFT Optimized Structure of the Cationic Moiety of 5, Color code: light blue, Ru; blue, N; red, O; gray, C; white, H.

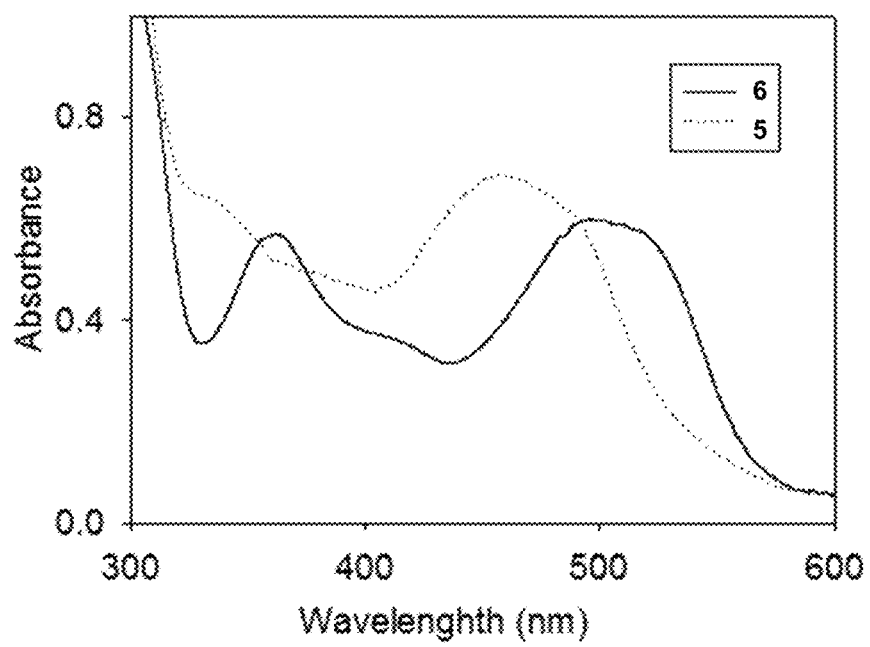
Figure 20. UV-vis Spectra of Ru-complexes 6 (Solid line) and 5 (dotted line) in $CH_2Cl_2$.

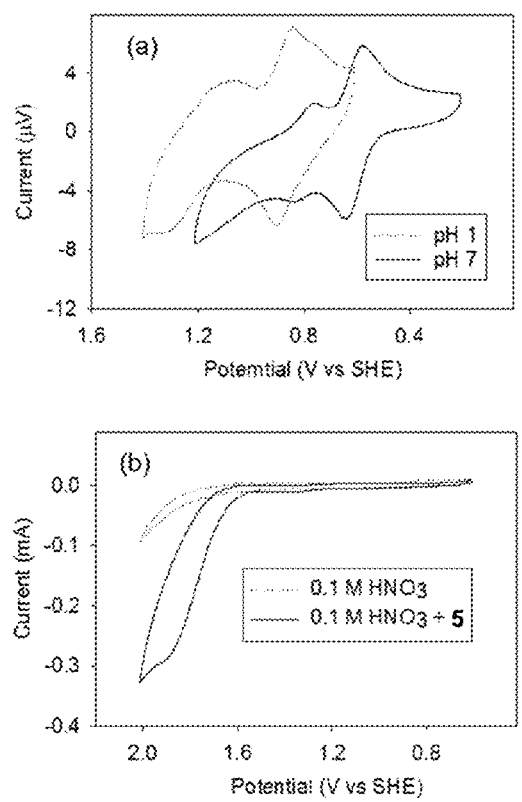
Figure 21. (a) Cyclic Voltammograms of 5 in Phosphate Buffer at pH 7 (solid line) and 0.1 M $HNO_3$ (dotted line); (b) Comparison of CV in the Absence (dotted line) and Presence (solid line) of 5 (1 mM) in 0.1 M $HNO_3$. Scan rate, 100 mV/s; working electrode, glassy carbon; counter electrode, Pt wire; reference electrode, Ag/AgCl.

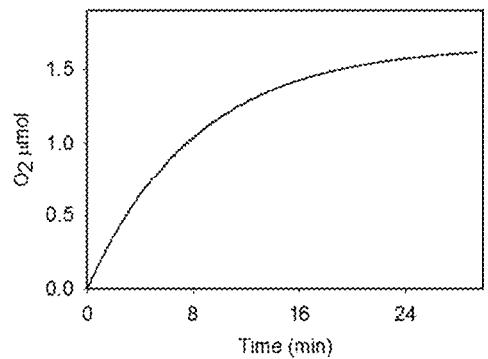
Figure 22. Oxygen Evolution vs Time after Addition of 0.33 M $Ce^{IV}$ to 3 mL of 0.2 mM Complexes 5 in 1.0 M $HNO_3$.

METAL COMPLEX CATALYSTS AND USES THEREOF

CROSS-REFERENCE TO RELATED APPLICATIONS

This application is a continuation-in-part of U.S. patent application Ser. No. 13/867,992, filed Apr. 22, 2013, which claims the benefit of and priority to U.S. Provisional Application No. 61/636,704, filed Apr. 22, 2012. This application also claims the benefit of and priority to U.S. Provisional Application No. 61/860,889, filed Jul. 31, 2013. The entire contents of the foregoing applications are incorporated herein by reference.

STATEMENT OF RIGHTS TO INVENTIONS MADE UNDER FEDERALLY SPONSORED RESEARCH

This work was supported by the National Science Foundation (NSF), Grant No. EPS 1004083; and the National Cancer Institute under Grant No. P30A027165. The government has certain rights in the invention.

BACKGROUND

The use of $H_2$ as a potential source of clean and renewable fuel has attracted great interest in an effort to reduce current dependence on fossil fuels.[1] Reduction of water to $H_2$, especially with visible light, has been a subject of intense study and a significant amount of efforts have been devoted towards designing metal complexes for proton reduction.

Over the past few years, a number of $H_2$ evolution catalysts based on metal complexes such as Co,[2] Ni,[3] Fe,[4] and Mo[5] have been reported and studied, especially in nonaqueous media, to provide insights into the mechanism of proton reduction. Recently, Eisenberg and coworkers described photocatalytic proton reduction catalyzed by a mononuclear cobalt-dithiolene complex with remarkable turnover number (TON) of >2700 per mol of Co catalyst in a 1:1 ratio of $CH_3CN/H_2O$.[2h]

Although there has been significant progress in designing molecular catalysts for $H_2$ evolution, the search of robust and highly active catalysts that can operate in purely aqueous solution, by either electrochemical or photochemical approaches, still remains a great challenge.[2e, 6]

SUMMARY OF THE INVENTION

The invention provides novel metal complexes that are useful as catalysts in redox reactions. In particular, the invention provides metal complexes, which comprise at least one transition metal complexed with N,N-bis(2-pyridinylmethyl)-2,2'-bipyridine-6-methanamine (DPA-Bpy), N,N-bis((isoquinolin-1-yl)methyl)(6-(pyridin-2-yl)pyridin-2-yl)methanamine (DIQ-Bpy), or a derivative thereof. The metal complexes of the invention are useful as catalysts in hydrogen production. In certain embodiments, the invention provides novel Co complexes as efficient electrocatalysts for producing $H_2$ from an aqueous solution. In other embodiments, the invention provides novel Co complexes as efficient photocatalysts for producing $H_2$ from an aqueous solution.

In one aspect, the invention relates to a metal complex of formula (I)

$$[M(G)Y]_m(X)_n(L)_a \quad (I)$$

wherein
M is a transition metal;
G is N,N-bis(2-pyridinylmethyl)-2,2'-bipyridine-6-methanamine (DPA-Bpy), N,N-bis((isoquinolin-1-yl)methyl)(6-(pyridin-2-yl)pyridin-2-yl)methanamine (DIQ-Bpy), or a derivative thereof;
Y, for each occurrence, independently is a halogen group or a water moiety;
X, for each occurrence, independently is an anion;
m is the number of cations per metal complex;
n is the number of anions per metal complex;
L is absent or a neutral molecule; and
a is the number of neutral molecules per metal complex (e.g., 0, 1, or 2);
provided that when G is N,N-bis(2-pyridinylmethyl)-2,2'-bipyridine-6-methanamine (DPA-Bpy), M is not Ru.

In certain embodiments, G is N,N-bis((isoquinolin-1-yl)methyl)(6-(pyridin-2-yl)pyridin-2-yl)methanamine (DIQ-Bpy). In other embodiments, G is N,N-bis(2-pyridinylmethyl)-2,2'-bipyridine-6-methanamine (DPA-Bpy).

In certain embodiments, M is Co, Ru, or Fe. In one embodiment, M is Co.

In a separate embodiment, Y in the formula (I) is chloride.

In one embodiment, a is 0. In another embodiment, a is 1.

In certain embodiments, the invention provides a metal complex of formula (I), in which X is the same for each occurrence and is $Cl^-$.

In other embodiments, L in the formula (I) is $(C_{1-3})$alkyl-CN (e.g., $CH_3CN$).

In specific embodiments, the invention provides cobalt complexes, such as $Co(DPA-Bpy)Cl_2$ ("complex 1") and $[Co(DPA-Bpy)(Cl)]Cl_2.(CH_3CN)$.

In other embodiments, the invention provides a complex of N,N-bis((isoquinolin-1-yl)methyl)(6-(pyridin-2-yl)pyridin-2-yl)methanamine (DIQ-Bpy). In a specific embodiment, the invention provides the complex $[Ru(DIQ-Bpy)(Cl)]Cl.(H_2O)_{2.5}$, $[Ru(DIQ-Bpy)(H_2O)](PF_6)_2$, or $[Ru(DIQ-Bpy)(Cl)](PF_6).H_2O$.

In certain embodiments, the invention provides a metal complex of formula (II)

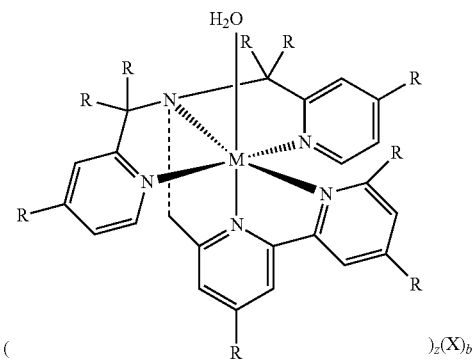

wherein
M is Co, Ru, Ni, or Fe;
R, for each occurrence, independently is H, $(C_{1-3})$alkyl, cyano, aryl, benzyl, amino, nitrile, carboxylate, hydroxyl, or ester;
X, for each occurrence, independently is an anion;
z is the number of cations per metal complex, and
b is the number of anions per metal complex;
or a salt, solvate or hydrate thereof.

In one embodiment, M in the formula (II) is Co. In another embodiment, M in the formula (II) is Ni.

In one embodiment, z in the formula (II) is 1.

In another embodiment, X is the same for each occurrence and is $PF_6^-$. In a separate embodiment, X is the same for each occurrence and is $BF_4^-$.

In certain embodiments, the invention provides [Co(DPA-Bpy)(OH$_2$)](PF$_6$)$_3$ ("complex 2"). The invention also provides Ni(DPA-ABpy)(OH$_2$)](BF$_4$) ("complex 3").

In another aspect, the invention provides a metal complex of formula (III):

or a salt, solvate or hydrate thereof;
wherein
M is a transition metal;
G is N,N-bis(2-pyridinylmethyl)-2,2'-bipyridine-6-methanamine ("DPA-Bpy"), 6'-((bis(pyridin-2-ylmethyl)amino)methyl)-N,N-dimethyl-2,2'-bipyridin-6-amine ("DPA-ABpy"), N,N-bis((isoquinolin-1-yl)methyl)(6-(pyridin-2-yl)pyridin-2-yl)methanamine (DIQ-Bpy), or a derivative thereof;
Y, for each occurrence, independently is absent, a halogen group or a water moiety;
X, for each occurrence, independently is an anion;
m is the number of cations per metal complex;
n is the number of anions per metal complex;
L is absent or a neutral molecule; and
a is the number of neutral molecules per metal complex (e.g., 0, 1, or 2);
provided that when G is N,N-bis(2-pyridinylmethyl)-2,2'-bipyridine-6-methanamine ("DPA-Bpy"), M is not Ru.

In one instance, the invention provides [Ni(DPA-ABpy)(OH$_2$)](BF$_4$)$_2$. In another instance, the invention provides [Ni(DPA-Bpy)(OH$_2$)](BF$_4$)$_2$.
In still another instance, the invention provides a metal complex of [Co(DPA-ABpy)](PF$_6$)$_2$.

The invention also provides the metal complexes in the form of salts, solvates, hydrates, or stereoisomers.

In another aspect, the invention relates to a catalyst, which comprises a metal complex of the invention.

The invention also provides a process for producing hydrogen from an aqueous solution by using a catalyst of the invention. The process comprises a step of adding the catalyst to the aqueous solution. In one instance, an electrolysis step is performed after the addition of the catalyst to the aqueous solution. In a certain situation, the aqueous solution after the addition of the catalyst has a pH value at about 7.

In another instance, the process of the invention includes a photolysis step on the aqueous solution after the catalyst is added. In one example, the aqueous solution also contains ascorbic acid. In another example, the pH value of the aqueous solution is within the range of about 3 to 6. In a specific example, the pH value of the aqueous solution is about 4.

In a particular embodiment, the invention relates to using [Co(DPA-Bpy)(OH$_2$)](PF$_6$)$_3$, [Ni(DPA-Bpy)(OH$_2$)](BF$_4$)$_2$, [Ni(DPA-ABpy)(OH$_2$)](BF$_4$)$_2$, or [Co(DPA-ABpy)](PF$_6$)$_2$, as the catalyst for the hydrogen production. In a particular embodiment, the invention relates to using [Ru(DIQ-Bpy)(Cl)]Cl.(H$_2$O)$_{2.5}$, [Ru(DIQ-Bpy) (H$_2$O)](PF$_6$)$_2$, or [Ru (DIQ-Bpy)(Cl)](PF$_6$).H$_2$O, as the catalyst for the hydrogen production.

The invention further provides design and synthesis of the metal complexes of the invention.

In certain embodiments, the invention relates to a method of preparing a metal complex of the invention, the method comprising:
1) adding a metal salt or its hydrate thereof to a solution containing N,N-Bis(2-pyridinylmethyl)-2,2'-Bipyridine-6-methanamine, 6'-((bis(pyridin-2-ylmethyl)amino)methyl)-N,N-dimethyl-2,2'-bipyridin-6-amine ("DPA-ABpy"), N,N-bis((isoquinolin-1-yl)methyl)(6-(pyridin-2-yl)pyridin-2-yl) methanamine ("DIQ-Bpy"), or a derivative thereof in a reaction solvent to obtain a mixture; and
2) allowing the metal to complex with N,N-Bis(2-pyridinylmethyl)-2,2'-Bipyridine-6-methanamine, 6'-((bis(pyridin-2-ylmethyl)amino)methyl)-N,N-dimethyl-2,2'-bipyridin-6-amine ("DPA-ABpy"), or N,N-bis((isoquinolin-1-yl) methyl)(6-(pyridin-2-yl)pyridin-2-yl)methanamine ("DIQ-Bpy"), or a derivative thereof, e.g., by refluxing the mixture of step 1).

In another aspect, the invention provides the compound N,N-bis((isoquinolin-1-yl)methyl)(6-(pyridin-2-yl)pyridin-2-yl)methanamine, or a derivative thereof.

In another aspect, the invention provides a metal complex comprising N,N-bis((isoquinolin-1-yl)methyl)(6-(pyridin-2-yl)pyridin-2-yl)methanamine or a derivative thereof, and a transition metal; or a salt, solvate, or hydrate thereof.

In certain embodiments, the transition metal is Co, Ru, Ni, or Fe. In certain embodiments, the complex further comprises an anion. In certain embodiments, the anion is $PF_6^-$ or $BF_4^-$. In certain embodiments, the complex is [Ru(DIQ-Bpy)(Cl)](PF$_6$).

Other aspects and embodiments of the invention are described herein.

and absence (dotted line) of 50 μM complex 2; (b) Stability test of 50 μM complex 2 in 1.0 M sodium phosphate buffer solution at pH 7.0. working electrode, mercury pool; counter electrode, Pt mesh; reference electrode, aqueous Ag/AgCl.

Figure 10:
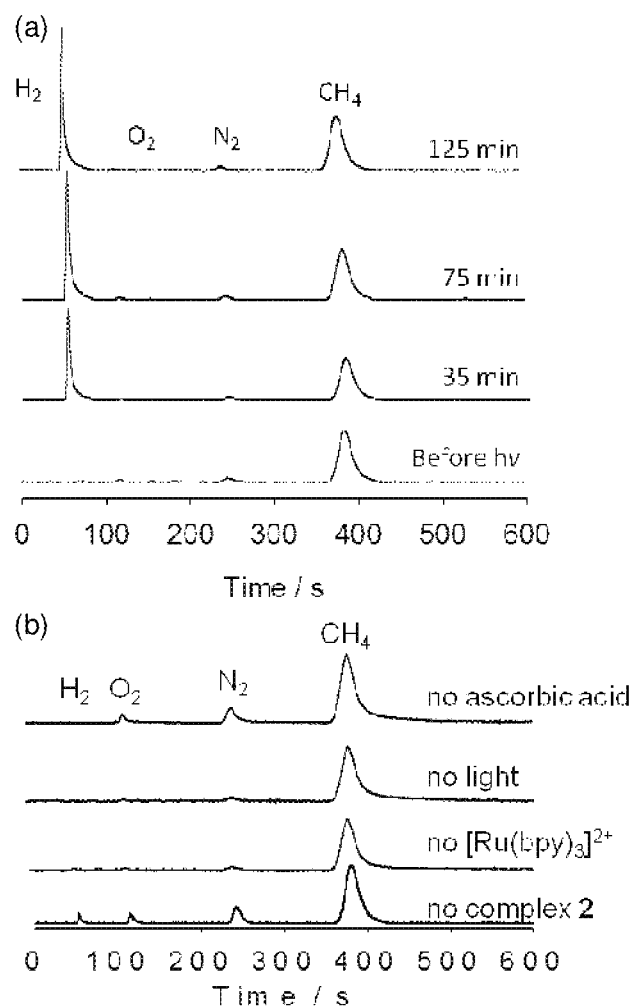

FIGS. 10a-b are GC-TCD chromatograms of $H_2$ production over time: (a) In 1.0 M acetate buffer at pH 4.0 containing complex 2 (5.0 μM), $[Ru(bpy)_3]^{2+}$ (0.5 mM), and ascorbic acid (0.1 M). LED light, 450 nm. (b) Control experiments in the absence of ascorbic acid, light, $[Ru(bpy)_3]^{2+}$, or Complex 2.

Figure 11:
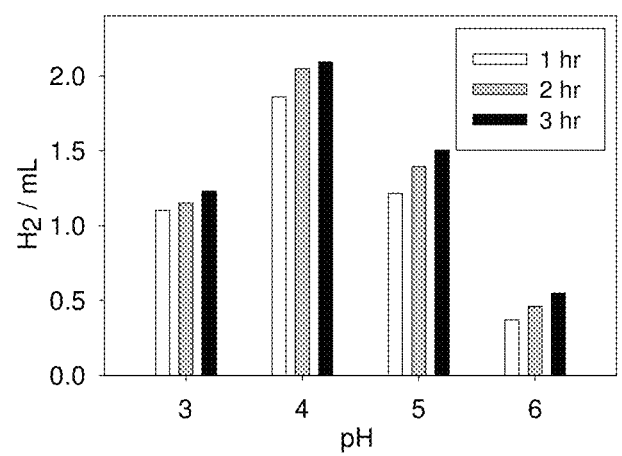

FIG. 11 is a chart showing photocatalytic $H_2$ evolution at various pH values. Conditions: 10 mL 1.0 M buffer solutions with [ascorbic acid]=0.1 M, $[Ru(bpy)_3]^{2+}$=0.5 mM, [complex 2]=5.0 μM, LED light: 450 nm.

Figure 12:
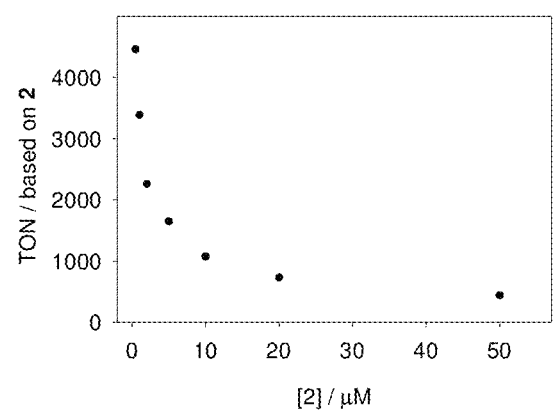

FIG. 12 is a chart showing photocatalytic $H_2$ evolution at various concentration of complex 2. Conditions: 10 mL 1.0 M acetate buffer at pH 4.0, [ascorbic acid]=0.1 M, $[Ru(bpy)_3]^{2+}$=0.5 mM, LED light: 450 nm.

Figure 13:
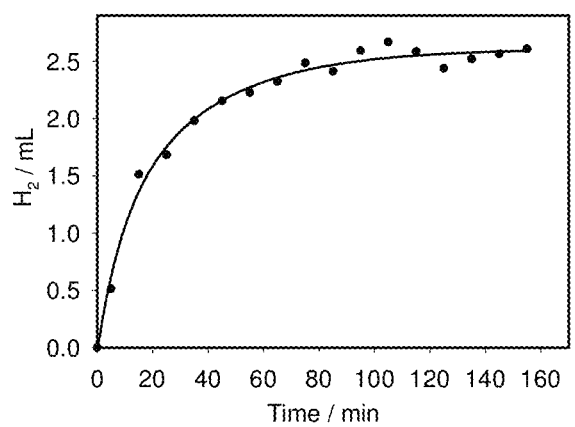

FIG. 13 is a chart showing photocatalytic $H_2$ production over time. Conditions: 10 mL 1.0 M acetate buffer at pH 4.0, [ascorbic acid]=0.5 M, $[Ru(bpy)_3]^{2+}$=2.0 mM, [complex 2]=5.0 μM, LED light: 450 nm.

Figure 14:
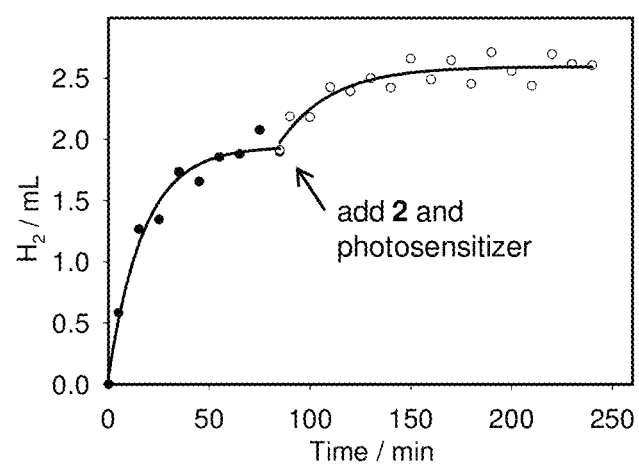

FIG. 14 is a chart showing photocatalytic $H_2$ production over time. Conditions: 10 mL 1.0 M acetate buffer at pH 4.0, [ascorbic acid]=0.1 M, $[Ru(bpy)_3]^{2+}$=0.5 mM, [2]=5.0 μM, LED light: 450 nm. The arrow indicates addition of complex 2 (5.0 μM) and $[Ru(bpy)_3]^{2+}$ (0.5 mM) after $H_2$ evolution stopped at indicated time.

Figure 15:
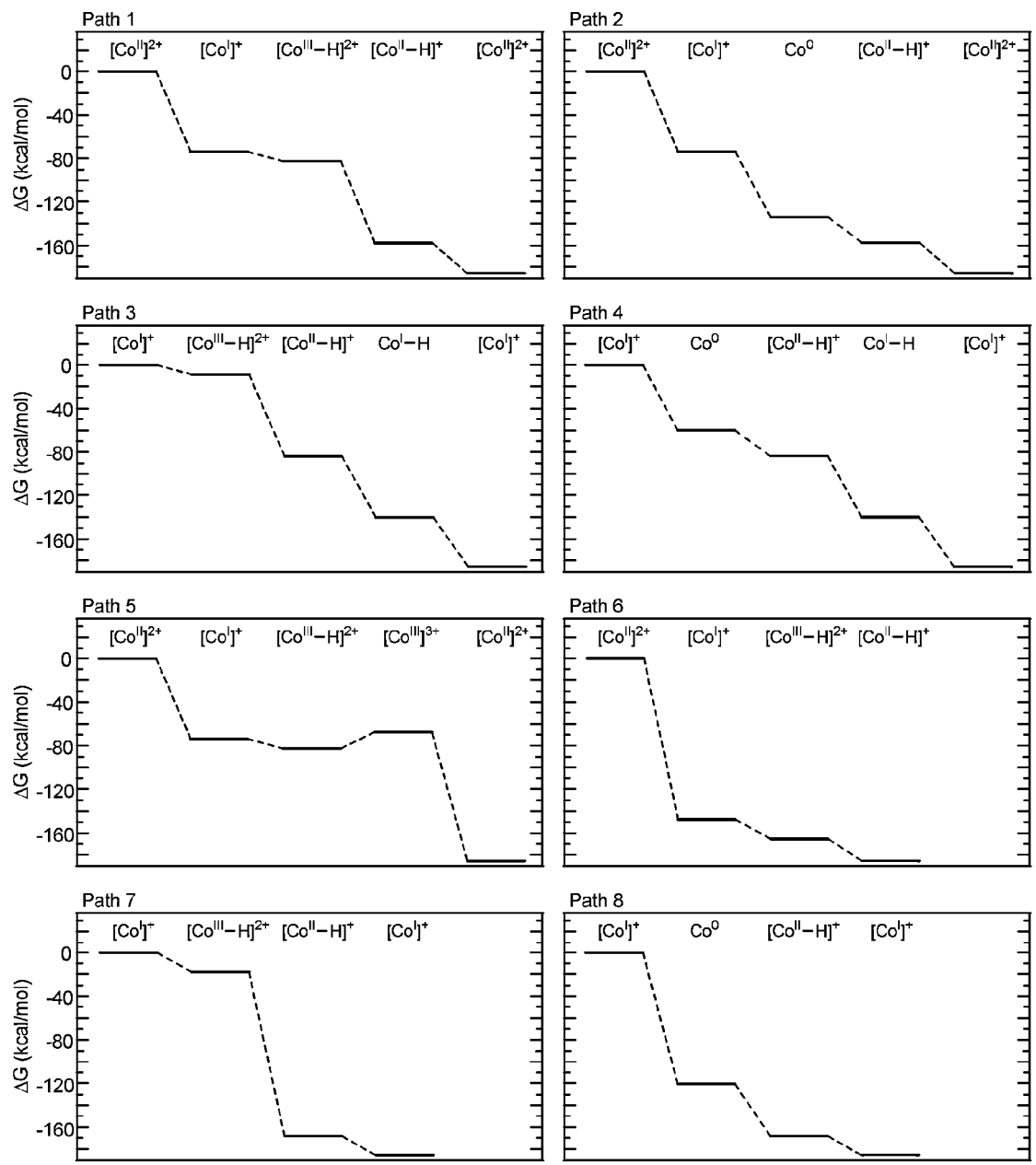

FIG. 15 presents relative free energy diagrams of postulated catalytic cycles of $H_2$ evolution by complex 2. Relative free energies are given per mole of $H_2$ produced.

Figure 16:
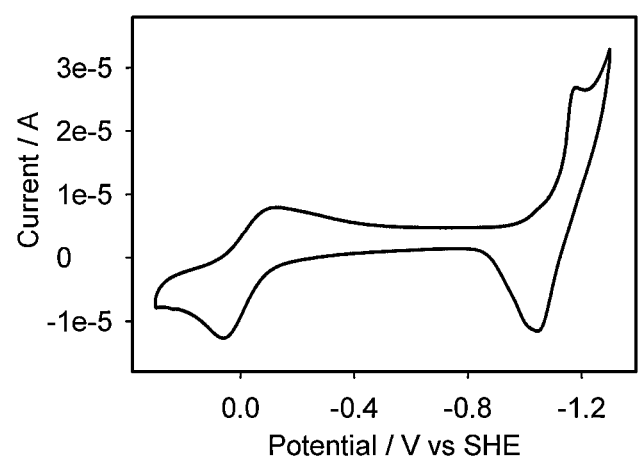

FIG. 16 is a chart presenting cyclic Voltammogram of complex 2 in 1.0 M sodium phosphate buffer at pH 7.0. Scan rate, 100 mV/s. Working electrode, glassy carbon; reference electrode, Ag/AgCl; counter electrode, Pt wire.

Figure 17:
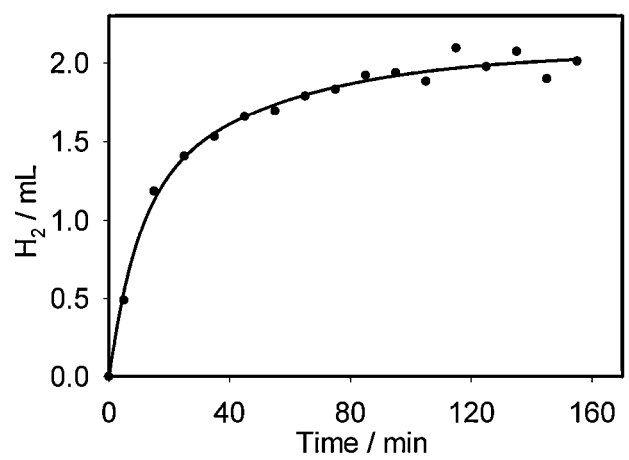

FIG. 17 is chart presenting potocatalytic $H_2$ production over time in 1.0 M acetate buffer at pH 4.0 with 0.1 M ascorbic acid, 0.5 mM $[Ru(bpy)_3]^{2+}$, and 5.0 μM Complex 2 at 22° C.

FIGS. 18 a-b) present molecular structures of (a) [Ni(DPA-ABpy)($H_2O$)][$BF_4$]$_2$ (complex 3) and (b) [Co(DPA-ABpy)][$PF_6$]$_2$ (complex 4).

FIG. 19 shows the DFT optimized structure of the cationic moiety of DIQ-Bpy complex 5.

FIG. 20 shows the UV-vis Spectra of Ru-complexes 6 (Solid line) and 5 (dotted line) in $CH_2Cl_2$.

FIG. 21. (a) Cyclic Voltammograms of 5 in Phosphate Buffer at pH 7 (solid line) and 0.1 M $HNO_3$ (dotted line); (b) Comparison of CV in the Absence (dotted line) and Presence (solid line) of 5 (1 mM) in 0.1 M $HNO_3$. Scan rate, 100 mV/s; working electrode, glassy carbon; counter electrode, Pt wire; reference electrode, Ag/AgCl.

FIG. 22. Oxygen Evolution vs Time after Addition of 0.33 M $Ce^{IV}$ to 3 mL of 0.2 mM Complexes 5 in 1.0 M $HNO_3$.

DETAILED DESCRIPTION

The invention provides novel metal complexes useful as catalysts in redox reactions. In particular, the invention provides novel transition metal (e.g., cobalt or nickel) complexes supported by a pentadentate ligand (such as, DPA-Bpy or DPA-ABpy), which can serve as catalysts for efficient $H_2$ production/evolution from aqueous solutions.

Definitions

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The term alkyl further includes alkyl groups, which can further include oxygen, nitrogen, sulfur or phosphorous atoms replacing one or more carbons of the hydrocarbon backbone, e.g., oxygen, nitrogen, sulfur or phosphorous atoms.

As used herein, the term "aryl" refers to the radical of aryl groups, including 5- and 6-membered single-ring aromatic groups that may include from zero to four heteroatoms, for example, benzene, pyrrole, furan, thiophene, imidazole, benzoxazole, benzothiazole, triazole, tetrazole, pyrazole, pyridine, pyrazine, pyridazine and pyrimidine, and the like. Aryl groups also include polycyclic fused aromatic groups such as naphthyl, quinolyl, indolyl, and the like. Those aryl groups having heteroatoms in the ring structure may also be referred to as "aryl heterocycles," "heteroaryls" or "heteroaromatics." The aromatic ring can be substituted at one or more ring positions with such substituents as described above, as for example, halogen, hydroxyl, alkoxy, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfates, sulfonato, sulfamoyl, sulfonamido, nitro, trifluoromethyl, cyano, azido, heterocyclyl, alkylaryl, or an aromatic or heteroaromatic moiety. Aryl groups can also be fused or bridged with alicyclic or heterocyclic rings which are not aromatic so as to form a polycycle (e.g., tetralin).

The term "carboxylate" refers to a moiety derived from a carboxylic group, for example, an alkyl-C(O)O— group.

The term "chiral" refers to molecules which have the property of non-superimposability of the mirror image partner, while the term "achiral" refers to molecules which are superimposable on their mirror image partner.

In this disclosure, "comprises," "comprising," "containing" and "having" and the like can have the meaning ascribed to them in U.S. patent law and can mean "includes," "including," and the like; "consisting essentially of" or "consists essentially" likewise has the meaning ascribed in U.S. patent law and the term is open-ended, allowing for the presence of more than that which is recited so long as basic or novel characteristics of that which is recited is not changed by the presence of more than that which is recited, but excludes prior art embodiments.

The term "diastereomers" refers to stereoisomers with two or more centers of dissymmetry and whose molecules are not mirror images of one another.

The term "halogen" designates —F, —Cl, —Br or —I.

The term "hydrate" refers to a metal complex of the invention or a salt thereof, which further includes a stoichiometric or non-stoichiometric amount of water bound by non-covalent intermolecular forces.

The term "hydroxyl" means —OH.

The term "heteroatom" as used herein means an atom of any element other than carbon or hydrogen. Heteroatoms include, such as, nitrogen, oxygen, sulfur and phosphorus.

The term "isotopic forms" refer to variants of a particular chemical element. All isotopes of a given element share the same number of protons, and each isotope differs from the others in its number of neutrons.

As used herein, "redox reactions" refer to reduction-oxidation reactions, in which certain atoms in chemical reagents involved in the reaction have their oxidation state changed.

As used herein, "a transition metal" refers to the element as appear in Groups 3 through 12 of the Periodic Table of the Elements, or an isotopic form thereof. The transition metals include, for example, iron (Fe), cobalt (Co), nickel (Ni), ruthenium (Ru), rhodium (Rh), manganese (Mn), technetium (Tc), palladium (Pd) and etc.

The term "solvate" as used herein refers to solvate forms of the metal complexes of the present invention.

Metal Complexes

The invention provides metal complexes that are useful as catalysts in redox reactions. In particular, the invention provides metal complexes as efficient catalysts for hydrogen production. In certain embodiments, the metal complexes of the invention are efficient electrocatalysts for producing $H_2$ from an aqueous solution. In other embodiments, the metal complexes of the invention are efficient photocatalysts for producing $H_2$ from an aqueous solution.

The metal complexes of the invention, for example, comprise at least one transition metal complexed with DPA-Bpy or its derivative thereof. In particular, in certain embodiments, the invention provides novel cobalt (Co) complexes, which comprise Co complexed with N,N-Bis(2-pyridinylmethyl)-2,2'-Bipyridine-6-methanamine (DPA-Bpy), N,N-bis((isoquinolin-1-yl)methyl)(6-(pyridin-2-yl)pyridin-2-yl)methanamine (DIQ-Bpy), or a derivative thereof. In certain embodiments, said derivative of DPA-Bpy is DPA-Bpy containing one or more substituents. In certain embodiments, the derivative of DIQ-Bpy is DIQ-Bpy containing one or more substituents, e.g., substituents on the isoquinoline ring(s) and/or on the pyridyl ring(s) of the N,N-bis((isoquinolin-1-yl)methyl)(6-(pyridin-2-yl)pyridin-2-yl)methanamine moiety.

In certain embodiments, the invention provides a metal complex of formula (I)

$$[M(G)Y]_m(X)_n(L)_a \qquad (I)$$

wherein
M is a transition metal;
G is N,N-bis(2-pyridinylmethyl)-2,2'-bipyridine-6-methanamine (DPA-Bpy), N,N-bis((isoquinolin-1-yl)methyl)(6-(pyridin-2-yl)pyridin-2-yl)methanamine (DIQ-Bpy) or a derivative thereof;
Y, for each occurrence, independently is a halogen group or a water moiety (i.e., $H_2O$);
X, for each occurrence, independently is an anion;
m is the number of cations per metal complex;
n is the number of anions per metal complex;
L is absent or a neutral molecule; and
a is the number of neutral molecules per metal complex;
provided that when G is N,N-bis(2-pyridinylmethyl)-2,2'-bipyridine-6-methanamine (DPA-Bpy), M is not Ru.

In certain embodiments, G is N,N-bis((isoquinolin-1-yl)methyl)(6-(pyridin-2-yl)pyridin-2-yl)methanamine (DIQ-Bpy). In other embodiments, G is N,N-bis(2-pyridinylmethyl)-2,2'-bipyridine-6-methanamine (DPA-Bpy).

In certain embodiments, the transition metal of the formula (I) is Co, Ni, Ru, or Fe.

Suitable anions for use as X include, such as, a fluorine ion, a chlorine ion (i.e., $Cl^-$), a bromine ion, an iodine ion, a sulfide ion, an oxide ion, a hydroxide ion, a hydride ion, a sulfite ion, a phosphate ion, a cyanide ion, an acetate ion, a carbonate ion, a sulfate ion, a nitrate ion, a hydrogen carbonate ion, a trifluoroacetate ion, an 2-ethylhexanoate ion, a thiocyanide ion, a trifluoromethane sulfonate ion, an acetyl acetonate, a tetrafuloroborate ion, a hexafluorophosphate ion (i.e., $PF_6^-$), a tetrafluoro borate ion (i.e., $BF_4^-$), and a tetraphenyl borate ion.

In certain embodiments, X is selected from the group of a chloride ion, a hexafluorophosphate ion, a tetrafluoro borate ion, a bromide ion, an iodide ion, an oxide ion, a hydroxide ion, a hydride ion, a phosphate ion, a cyanide ion, an acetate ion, a carbonate ion, a sulfate ion, a nitrate ion, a 2-ethylhexanoate ion, an acetyl acetonate, and a tetraphenyl borate ion.

In certain embodiments of the metal complexes of the formula (I), X is the same for each occurrence and is $Cl^-$. In other embodiments, X is the same for each occurrence and is $PF_6^-$.

Y, for each occurrence, independently is a halogen group (such as, F, Cl, Br, I) or a water moiety. In one embodiment, Y is Cl. In another embodiment, Y is $H_2O$.

L in the formula (I) is either absent or a neutral molecule. Examples of the neutral molecule include, for example, alkyl-cyanide (such as, acetonitrile), water, methanol, ethanol, n-propanol, isopropyl alcohol, 2-methoxyethanol, 1,1-dimethyl ethanol, ethylene glycol, N,N'-dimethyl formamide, N,N'-dimethyl acetamide, N-methyl-2-pyrrolidone, dimethyl sulfoxide, acetone, chloroform, acetonitrile, benzonitrile, triethyl amine, pyridine, pyrazine, diazabicyclo[2,2,2]octane, 4,4'-bipyridine, tetrahydrofuran, diethyl ether, dimethoxy ethane, methylethyl ether, and 1,4-dioxane, and preferably water, methanol, ethanol, isopropyl alcohol, ethylene glycol, N,N'-dimethyl formamide, N,N'-dimethyl acetamide, N-methyl-2-pyrrolidone, chloroform, acetonitrile, benzonitrile, triethyl amine, pyridine, pyrazine, diazabicyclo[2,2,2]octane, 4,4'-bipyridine, tetrahydrofuran, dimethoxy ethane, and 1,4-dioxane.

In one embodiment, L in the formula (I) is $(C_{1-3})$alkyl-cyanide (e.g., acetonitrile; "$CH_3CN$").

In one embodiment, a in the formula (I) is 0. In another embodiment, a is 1.

Figure 1:
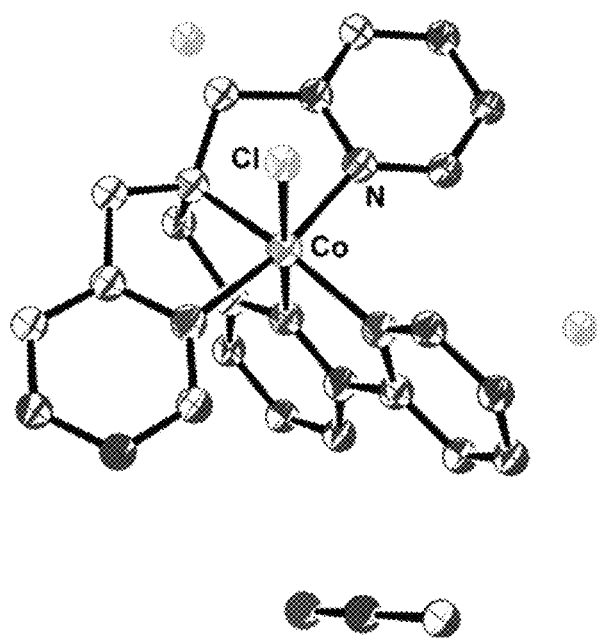
FIG. 1 presents molecular structure of [Co(DPA-Bpy)(Cl)]Cl$_2$.(CH$_3$CN) with thermal ellipsoids drawn at the 50% probability level.

In specific embodiments, the invention provides cobalt complexes, such as, $Co(DPA-Bpy)Cl_2$ (or "Complex 1") and $[Co(DPA-Bpy)(Cl)]Cl_2 \cdot (CH_3CN)$ (see FIG. 1 for its molecular structure).

The structure of $Co(DPA-Bpy)Cl_2$ is provided as follows:

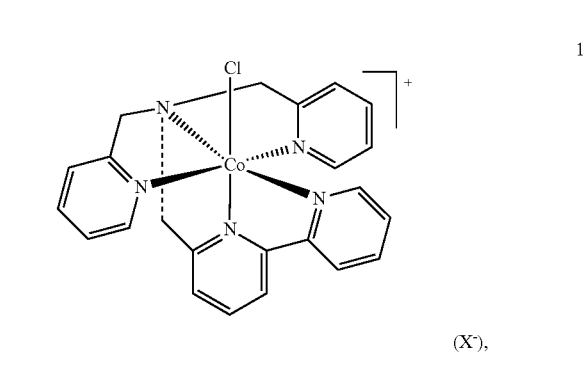

X = Cl

In certain embodiments, the invention provides a metal complex of formula (II)

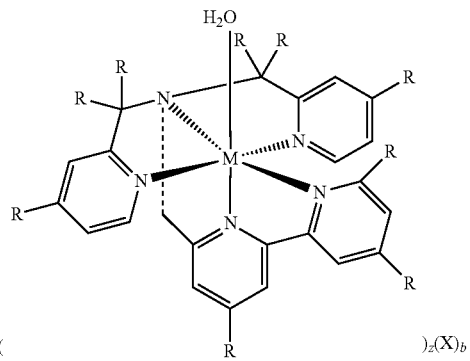

wherein
M is Co, Ru, Ni, or Fe;
R, for each occurrence, independently is H, (C$_{1-3}$)alkyl, cyano, aryl, benzyl, amino, nitrile, carboxylate, hydroxyl, or ester;
X, for each occurrence, independently is an anion;
z is the number of cations per metal complex; and
b is the number of anions per metal complex;
or a salt, solvate or hydrate thereof.

In certain embodiments, M in the formula (II) is Co. In other embodiments, M in the formula (II) is Ni.

In one embodiment, z in the formula (II) is 1. In another embodiment, X is the same for each occurrence and is PF$_6^-$. In still another embodiment, X is the same for each occurrence and is BF$_4^-$.

For example, the invention provides [Co(DPA-Bpy)(OH$_2$)](PF$_6$)$_3$ ("complex 2") with the following structure:

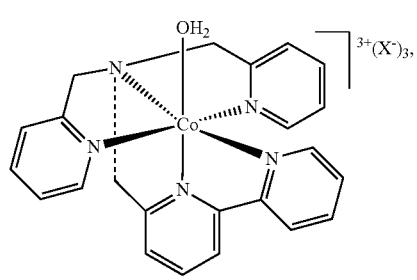

X = PF$_6$

The invention also provides [Ni(DPA-ABpy)(OH$_2$)](BF$_4$) ("complex 3") with the structure presented in FIG. 18a. As shown in FIG. 18a, the Ni center in complex 3 is in an octahedral geometry, with the 6th ligand being a solvent molecule.

Alternatively, the invention provides [Ni(DPA-Bpy)(H$_2$O)](BF$_4$)$_2$ as a metal complex.

The invention also provides a metal complex of formula (III):

[M(G)Y]$_m$(X)$_n$(L)$_a$    (III)

or a salt, solvate or hydrate thereof;
wherein
M is a transition metal;
G is N,N-bis(2-pyridinylmethyl)-2,2'-bipyridine-6-methanamine (DPA-Bpy), 6'-((bis(pyridin-2-ylmethyl)amino)methyl)-N,N-dimethyl-2,2'-bipyridin-6-amine (DPA-ABpy), N,N-bis((isoquinolin-1-yl)methyl)(6-(pyridin-2-yl)pyridin-2-yl)methanamine (DIQ-Bpy), or a derivative thereof;
Y, for each occurrence, independently is absent, a halogen group or a water moiety;
X, for each occurrence, independently is an anion;
m is the number of cations per metal complex;
n is the number of anions per metal complex;
L is absent or a neutral molecule; and
a is the number of neutral molecules per metal complex (e.g., 0, 1, or 2);
provided that when G is N,N-bis(2-pyridinylmethyl)-2,2'-bipyridine-6-methanamine ("DPA-Bpy"), M is not Ru.

In certain embodiments, a derivative of N,N-bis((isoquinolin-1-yl)methyl)(6-(pyridin-2-yl)pyridin-2-yl)methanamine (DIQ-Bpy) is a compound having one or two substituents (such as those substituents described supra for aryl groups) on one or both of the pyridinyl rings of the 2-pyridinylmethyl groups, or on one or both of the pyridinyl rings of the 6-(pyridin-2-yl)pyridine group. In certain embodiments, a derivative of N,N-bis(2-pyridinylmethyl)-2,2'-bipyridine-6-methanamine (DPA-Bpy) or 6'-((bis(pyridin-2-ylmethyl)amino)methyl)-N,N-dimethyl-2,2'-bipyridin-6-amine (DPA-ABpy) is a compound having one or two substituents (such as those substituents described supra for aryl groups) on one or both of the pyridinyl rings of the 2-pyridinylmethyl groups, or on one or both of the pyridinyl rings of the 2,2'-bipyridin-6-amine.

In formula (III), the transition metal ("M") can be, for example, Co, Ru, Ni, or Fe. In one embodiment, G is DPA-Bpy. In another embodiment, G is DPA-ABpy.

In certain embodiments, Y is absent. In other embodiments, Y is a water moiety.

X can be any ion as above delineated. In one embodiment, X is PF$_6^-$. In another embodiment, X is BF$_4^-$. Further, X can be the same or different for each occurrence in a metal complex.

Exemplified metal complexes of formula (III) include, for example, [Ni(DPA-ABpy)(OH$_2$)](BF$_4$)$_2$ ("complex 3") and [Co(DPA-ABpy)](PF$_6$)$_2$ ("complex 4"), or a salt, solvate or hydrate thereof. As illustration, the structure of complex 4 is provided in FIG. 18b. As can be seen from FIG. 18b, the Co center in complex 4 adopts a trigonal bipyramidal geometry.

The invention also provides the metal complexes in the form of salts, solvates, hydrates, or stereoisomers of the metal complexes as described herein.

The metal complex of the invention may form a layered crystal lattice. In certain embodiments, the metal complexes of the invention further include metal complexes in which a metal-containing compound, for example a salt or another metal complex, is incorporated into the crystal lattice of the metal complex of the invention. In this case, in the formulae (I) to (III), a portion of the cobalt can be replaced by other metal ions, or further metal ions can enter into a more or less pronounced interaction with the metal complex.

The structures of the metal complexes of the invention may include asymmetric carbon atoms. Accordingly, the isomers arising from such asymmetry (e.g., racemates, racemic mixtures, single enantiomers, individual diastereomers, diastereomeric mixtures) are included within the scope of this invention, unless indicated otherwise.

The metal complexes of the invention can be obtained by: synthesizing the ligand organo-chemically; and mixing the ligand and a reaction agent that provides the metal atom in a reaction solvent.

Isomers of the metal complexes of the invention can be obtained in substantially pure form by classical separation techniques and/or by stereochemically controlled synthesis. For example, optical isomers may be prepared from their respective optically active precursors by the procedures described above, or by resolving the racemic mixtures. The resolution can be carried out in the presence of a resolving agent, by chromatography or by repeated crystallization or by some combination of these techniques which are known to those skilled in the art. Further details regarding resolutions can be found in Jacques, et al., *Enantiomers, Racemates, and Resolutions* (John Wiley & Sons, 1981). The metal complexes of this invention may also be represented in multiple tautomeric forms, in such instances, the invention expressly includes all tautomeric forms of the metal complexes described herein (e.g., alkylation of a ring system may result in alkylation at multiple sites, the invention expressly includes all such reaction products).

In addition, the metal complexes of the invention may contain one or more double or triple bonds in their structures. Thus, the metal complexes can occur as cis- or trans- or E- or Z-double isomeric forms, which are included within the scope of this invention.

Further, all crystal forms of the metal complexes of the invention are also expressly included in the present invention.

A metal complex of the invention can be prepared as an acid by reacting the free base form of the compound with a suitable inorganic or organic acid. Alternatively, a metal complex of the invention can be prepared as a base by reacting the free basic form of the compound with a suitable inorganic or organic base. For example, a metal complex of the invention in an acid addition salt form can be converted to the corresponding free base by treating with a suitable base (e.g., ammonium hydroxide solution, sodium hydroxide, and the like). A metal complex of the invention in a base addition salt form can be converted to the corresponding free acid by treating with a suitable acid (e.g., hydrochloric acid, etc.).

Alternatively, the salt forms of the metal complexes of the invention can be prepared using salts of the starting materials or intermediates.

Protected derivatives of the metal complexes of the invention can be made by means known to those of ordinary skill in the art. A detailed description of techniques applicable to the creation of protecting groups and their removal can be found in T. W. Greene, "Protecting Groups in Organic Chemistry", 3rd edition, John Wiley and Sons, Inc., 1999.

The metal complexes of the present invention can be conveniently prepared, or formed during the process of the invention, as solvates (e.g., hydrates). Hydrates of the metal complexes of the invention can be conveniently prepared by recrystallization from an aqueous/organic solvent mixture, using organic solvents such as dioxin, tetrahydrofuran or methanol.

The metal complexes of this invention may be modified by attaching to various other ligands via any means delineated herein to enhance catalytic properties.

The metal complexes of the invention are defined herein by their chemical structures and/or chemical names. Where a metal complex is referred to by both a chemical structure and a chemical name, and the chemical structure and chemical name conflict, the chemical structure is determinative of the compound's identity.

The recitation of a listing of chemical groups in any definition of a variable herein includes definitions of that variable as any single group or combination of listed groups.

The recitation of an embodiment for a variable herein includes that embodiment as any single embodiment or in combination with any other embodiments or portions thereof.

Processes and Methods

The invention also provides a catalyst, which comprises a metal complex of the invention.

Further, the invention provides a process for producing hydrogen by using a catalyst of the invention. In certain embodiments, hydrogen is produced from an aqueous solution. The process comprises a step of adding the catalyst to a solution (such as, an aqueous solution).

In one instance, an electrolysis step is performed after the addition of the catalyst to the aqueous solution. In a certain situation, the aqueous solution after the addition of the catalyst has a pH value at about 7.

In another instance, the process of the invention includes a photolysis step on the aqueous solution after the catalyst is added. In one example, the aqueous solution also contains ascorbic acid. In another example, the pH value of the aqueous solution is within the range of about 3 to 6. In a specific example, the pH value of the aqueous solution is about 4.

In one embodiment, the invention relates to using a cobalt metal complex (such as, [Co(DPA-Bpy)(OH$_2$)](PF$_6$)$_3$ and [Co(DPA-ABpy)](PF$_6$)$_2$) as the catalyst for hydrogen production.

The invention also provides a nickel metal complex (e.g., [Ni(DPA-ABpy)(OH$_2$)](BF$_4$) or [Ni(DPA-Bpy)(H$_2$O)](BF$_4$)$_2$) as the catalyst.

The metal complex of the invention can be obtained by mixing a ligand and a metal-providing agent in the presence of an appropriate reaction solvent.

For example, a metal complex of the invention can be prepared by the following method:

1) adding a metal salt or its hydrate thereof to a solution containing a pentadentate ligand (such as, N,N-Bis(2-pyridinylmethyl)-2,2'-Bipyridine-6-methanamine or 6'((bis(pyridin-2-ylmethyl)amino)methyl)-N,N-dimethyl-2,2'-bipyridin-6-amine), N,N-bis((isoquinolin-1-yl)methyl)(6-(pyridin-2-yl)pyridin-2-yl)methanamine (DIQ-Bpy), or a derivative thereof in a reaction solvent to obtain a mixture; and 2) refluxing the mixture of step 1).

Examples of suitable reaction solvent include water, acetonitrile, acetic acid, oxalic acid, ammonia water, methanol, ethanol, n-propanol, isopropyl alcohol, 2-methoxyethanol, 1-butanol, 1,1-dimethylethanol, ethylene glycol, diethyl ether, 1,2-dimethoxyethane, methylethyl ether, 1,4-dioxane, tetrahydrofuran, benzene, toluene, xylene, mesitylene, durene, decalin, dichloromethane, chloroform, carbon tetrachloride, chlorobenzene, 1,2-dichlorobenzene, N,N'-dimethylformamide, N,N'-dimethyl acetamide, N-methyl-2-pyrrolidone, dimethylsulfoxide, acetone, benzonitrile, triethylamine, and pyridine. A reaction solvent obtained by mixing two or more kinds of them may be used and a solvent which can dissolve a ligand and a metal-providing agent is preferred.

In certain embodiments, the reaction solvent is water, acetonitrile, or a mixture thereof.

Reactions can be performed at a temperature of about −10 to 200° C., for example, 0 to 150° C., or 0 to 100° C. The reaction can be performed in a time period of about 1 minute to 1 week, such as, 5 minutes to 24 hours, or about 1 hour to 12 hours. The reaction temperature and the reaction time can also be appropriately optimized depending on the kinds of the ligand, the metal-providing agent, and chemical reagents used in the reaction.

Reactions for preparing the metal complexes of the invention may use acids and/or bases to facilitate its progress. Acids and bases useful in the methods herein are known in the art. Acids include any acidic chemicals, which can be inorganic (e.g., ascorbic acid, hydrochloric, sulfuric, nitric acids, aluminum trichloride) or organic (e.g., camphorsulfonic acid, p-toluenesulfonic acid, acetic acid, ytterbium triflate) in nature. Acids are useful in either catalytic or stoichiometric amounts to facilitate the reactions. Bases refer to any basic chemicals, which can be inorganic (e.g., sodium bicarbonate, potassium hydroxide) or organic (e.g., triethylamine, pyridine) in nature. Bases are useful in either catalytic or stoichiometric amounts to facilitate the reactions.

Additionally, various preparation steps may be performed in an alternate sequence or order to give the desired metal complexes. In addition, the solvents, temperatures, reaction durations, etc. delineated herein are for purposes of illustration only and one of ordinary skill in the art will recognize that variation of the reaction conditions can produce the desired metal complexes of the present invention. Synthetic chemistry transformations and protecting group methodologies (protection and deprotection) useful in synthesizing the metal complexes described herein are known in the art and include, for example, those such as described in R. Larock, Comprehensive Organic Transformations, VCH Publishers (1989); T. W. Greene and P. G. M. Wuts, Protective Groups in Organic Synthesis, 2d. Ed., John Wiley and Sons (1991); L. Fieser and M. Fieser, Fieser and Fieser's Reagents for Organic Synthesis, John Wiley and Sons (1994); and L. Paquette, ed., Encyclopedia of Reagents for Organic Synthesis, John Wiley and Sons (1995), and subsequent editions thereof.

The prepared metal complexes can be separated from the reaction mixture and further purified by a method described herein and/or by methods, such as, a recrystallization method, a redeposit method, and a chromatography method. Further, two or more of the separation methods may be employed in combination. As can be appreciated by the skilled artisan, further methods of synthesizing and/or separating the metal complexes of the formulae herein will be evident to those of ordinary skill in the art.

The produced metal complex may precipitate depending on the kind of the reaction solvent; the precipitated metal complex can be isolated and purified by separating the metal complex by a solid-liquid separation method such as filtration and subjecting the separated product to a washing operation and a drying operation as required.

The invention further provides design and synthesis of metal complexes that are useful as catalysts in redox reactions.

Density Functional Theory (DFT) Calculations

Theoretical calculations were carried out with the Gaussian 09 software package (M. J. Frisch et al., Gaussian, Inc., Wallingford, Conn., 2009). Density functional theory was used with PBE exchange and correlation functionals in conjunctions with default pruned course grids for gradients and Hessians (35, 110) [neither grid is pruned for cobalt], and the default SCF convergence criterion for geometry optimizations ($10^{-8}$) (R. G. Parr et al., Density Functional Theory of Atoms and Molecules, Oxford University Press, New York, 1989; J. P. Perdew et al., Phys. Rev. Lett. 1996, 77, 3865-3868; and J. P. Perdew et al., Phys. Rev. Lett. 1997, 78, 1396). Two basis set combinations were utilized in this study. For BS1, the basis set utilized for cobalt was the Hay and Wadt basis set (BS) and effective core potential (ECP) combination (LanL2DZ) as modified by Couty and Hall, where the two outermost p functions have been replaced by a (41) split of the optimized cobalt 4p function; and the 6-31G(d') basis sets were used for all other atoms (P. J. Hay et al., J. Chem. Phys. 1985, 82, 299-310; M. Couty et al., J. Comput. Chem. 1996, 17, 1359-1370; W. J. Hehre et al., J. Chem. Phys. 1972, 56, 2257; & P. C. Hariharan et al. Theor. Chim. Acta 1973, 28, 213-222).

For BS2, the all electron 6-311+G** basis sets were used for all atoms (R. Krishnan et al., J. Chem. Phys. 1980, 72, 650-654; K. Raghavachari et al., J. Chem. Phys. 1989, 91, 1062-1065; P. J. Hay, J. Chem. Phys. 1977, 66, 4377-4384; A. J. H. Wachters, J. Chem. Phys. 1970, 52, 1033-1036). The density fitting approximation for the fitting of the Coulomb potential was used for all PBE calculations; auxiliary density-fitting basis functions were generated automatically for the specified AO basis set (B. I. Dunlap, J. Chem. Phys. 1983, 78, 3140-3142; B. I. Dunlap, J Mol Struc-Theochem 2000, 529, 37-40; B. I. Dunlap et al., J. Chem. Phys. 1979, 71, 3396-3402; B. I. Dunlap et al., J. Chem. Phys. 1979, 71, 4993-4999). The Hessian was computed on gas-phase optimized geometries and standard statistical mechanical relationships were used to determine the change in Gibbs Free energy in the gas phase, $\Delta G_{gas}$. The solvation free energies, $\Delta G_{solv}$, were calculated using the SMD method (A. V. Marenich et al., J. Phys. Chem. B 2009, 113, 6378-6396). The SMD solvation model was used with the default parameters consistent with water and acetonitrile as the solvent.

The reaction free energy changes of possible mechanisms in water were calculated with the free energy changes in the gas phase and the solvation free energies of the reactants and products in a Born-Haber cycle (Eq. 1). The computed free energy of solution, $\Delta G_{so\ ln}^{comp}$, is calculated from the free energy change in the gas phase of the redox couple, $\Delta G_{gas}^{redox}$, the solvation free energy change between the oxidized [$\Delta G_{solv}^{comp}(ox)$] and the reduced species [$\Delta G_{solv}^{comp}(red)$], and the number of protons, lost from the complex to solution (n) (Eq 1). In order to account for the loss of a proton to solvent water or acetonitrile, the experimental value for the solvation of a proton [$\Delta G_{H_2O}^{exp}(H^+)=-265.9$ kcal/mol and $\Delta G_{acetonitrile}^{exp}(H^+)=-260.2$ kcal/mol] and the gas-phase Gibbs free energy of a proton [$\Delta G_{gas}^{exp}(H^+)=-6.28$ kcal mol$^{-1}$] were used (C. P. Kelly et al., J. Phys. Chem. B 2006, 111, 408-422; C. P. Kelly et al., J. Phys. Chem. B 2006, 110, 16066-16081; and A. Moser et al., J. Phys. Chem. B 2010, 114, 13911-13921).

$$\Delta G_{so\ ln}^{comp} = \Delta G_{gas}^{redox,comp} + \Delta G_{solv}^{comp}(red) - \Delta G_{solv}^{comp}(ox) - n[\Delta G_{solv}^{exp}(H^+) + \Delta G_{gas}^{exp}(H^+)] \quad \text{Eq 1}$$

$\Delta G_{so\ ln}^{comp}$ in acetonitrile are used to determine the standard one electron redox potential, $E_{so\ ln}^{\circ,comp}$, where F is the Faraday constant, 23.06 kcal mol$^{-1}$V$^{-1}$ (Eq 2).

$$E_{so\ ln}^{\circ,comp} = -\frac{\Delta G_{so\ ln}^{comp}}{1 \times F} \quad \text{Eq 2}$$

Calculations on Metal Complexes of the Invention and Possible Mechanisms

To provide insight into the mechanism of proton reduction by complex 2, DFT calculations were performed to explore the possible reaction intermediates, and the reaction free energy changes of possible pathways for proton reduction (see Table 1, Schemes A and B and FIG. 14).

The computed reduction potentials of complex 2 in water are shown in Table 1.

TABLE 1

Experimental and computed redox potentials of complex 2 in water, $E_{1/2}$, V vs SHE

|  | Exp. | BS1 | BS2 |
|---|---|---|---|
| $Co^{III/II}$ | 0.15 | 0.09 | 0.08 |
| $Co^{II/I}$ | −0.90 | −1.07 | −0.71 |

Without wishing to be bound by any theory, Scheme A presents possible mechanisms of $H_2$ evolution/production catalyzed by the cobalt complexes of the invention.

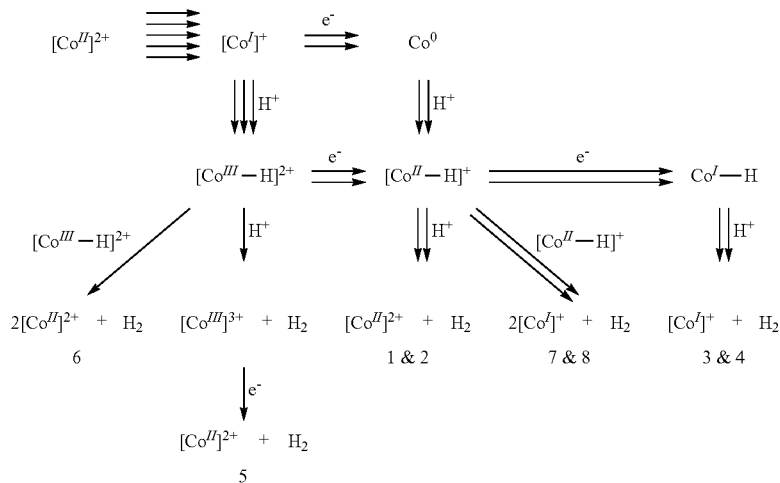

Scheme A. Possible mechanistic pathways of $H_2$ evolution by complex 2.

In the above scheme, pathways 1-5 show mononuclear reactions and pathways 6-8 show dinuclear reactions of the $H_2$ evolution.

FIG. 15 demonstrates the relative energy change of each step for the pathways listed in Scheme A. Dinuclear mechanisms are plotted with 2 moles of reaction species. Except pathway 5, all the mechanistic pathways are thermodynamically favored. Therefore, further kinetic and mechanistic studies are needed to differentiate the reaction pathways listed in Scheme A.

Free energy changes of the mechanistic steps were calculated and provided in Scheme B:

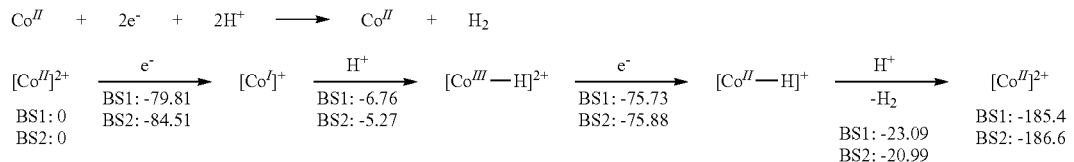

Scheme B. Postulated intermediates (with computed relative free energies) for $H_2$ evolution by complex 2.

-continued

Path 2:

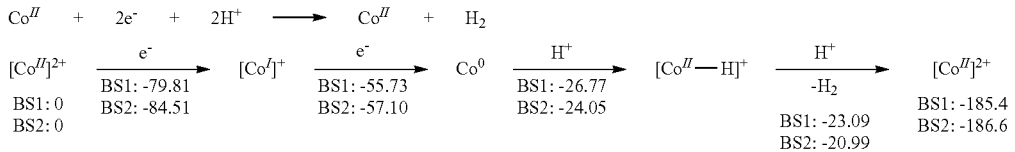

Path 3:

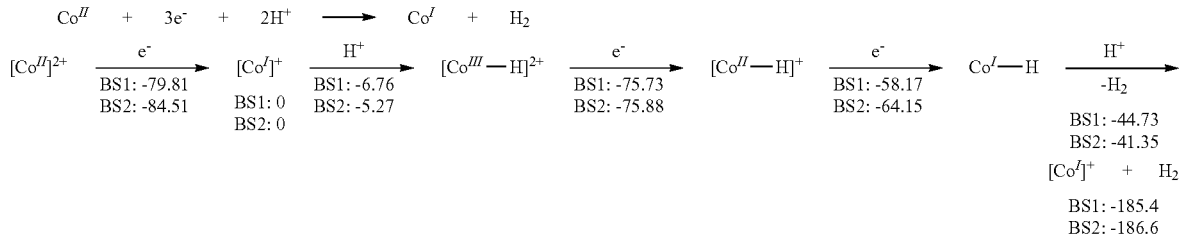

Path 4:

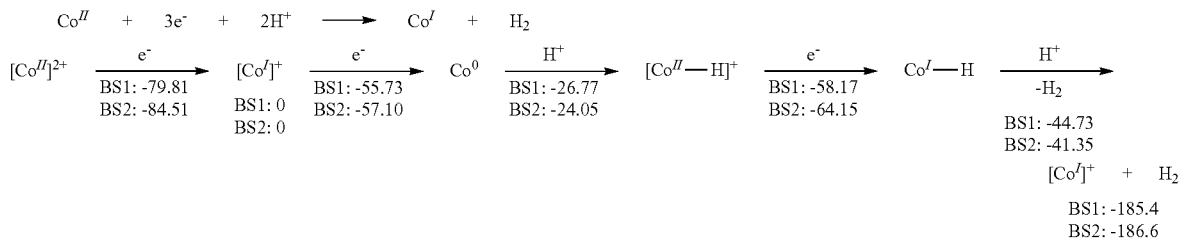

Path 5:

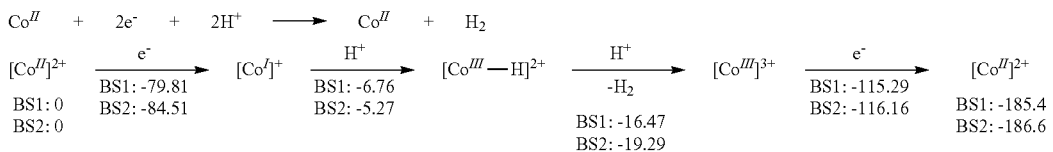

Path 6:

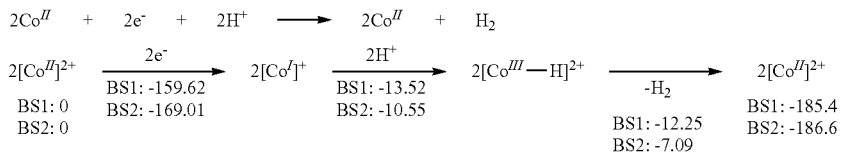

Path 7:

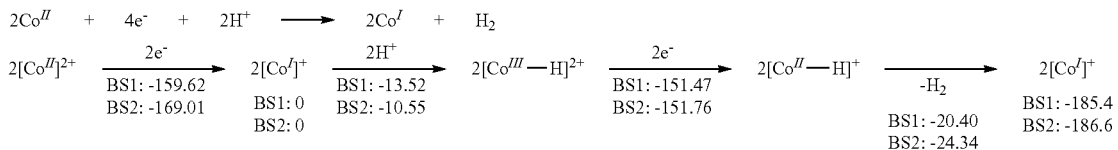

Path 8:

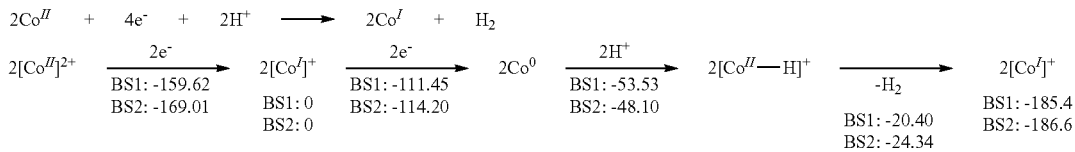

In Scheme B, units in mononuclear reactions (Path 1-5) are kcal mole of cobalt; and units in dinuclear reactions (Path 5-8) are kcal/2 moles of cobalt. Values below reaction arrows are free energy changes of each step ($\Delta(\Delta G)$); values given in bold font are relative free energies of catalytic species for the production of $H_2$ ($\Delta G$).

The free energy change of $H_2$ evolution, $2H^+ + 2e^- \rightarrow H_2$, was found to be $-185.4$ kcal/mol (BS1) and $-186.6$ kcal/mol (BS2), which are 4.02 V (BS1) and 4.05 V (BS2) for calculated absolute potentials. These computed values are 0.4 V lower than the experimental value for the absolute potential of the SHE in water ($4.44 \pm 0.02$ V) (S. Trasatti,

*Pure Appl. Chem.* 1986, 58, 955-966). The differences in the values for the redox potentials are relatively accurate.

Results from DFT computations suggest that a number of reaction pathways are thermodynamically favorable for proton reduction by complex 2, such as the one shown in Scheme 2 where the binding of proton to the Co$^I$ form of complex 2 yields the Co$^{III}$—H species. Further reduction of Co$^{III}$—H to Co$^{II}$—H species followed by binding of another proton results in H$_2$ evolution (Scheme 2).

Scheme 2. Proposed mechanism for the proton reduction by 2.

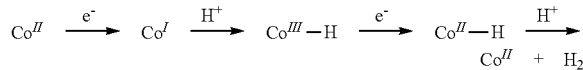

Results from DFT computations suggest that a number of reaction pathways are thermodynamically favourable for proton reduction by complex 2, such as the one shown in Scheme 2 where the binding of proton to the Co$^I$ form of complex 2 yields the Co$^{III}$—H species. Further reduction of Co$^{III}$—H to Co$^{II}$—H species followed by binding of another proton results in H$_2$ evolution (Scheme 2).

EXEMPLIFICATION OF THE INVENTION

The following examples are put forth so as to provide those of ordinary skill in the art with a complete disclosure and description of how to make and use the metal complexes of the invention. The method for preparation can include the use of one or more intermediates, chemical reagents and synthetic routes as delineated herein.

I. General Procedures and Instrumentation

The metal complexes of the invention can be prepared or used by methods described in this section, the examples, and the chemical literature.

1. Materials and Syntheses

All experiments were conducted under an Ar atmosphere unless noted. All chemicals and reagents were purchased from Sigma-Aldrich unless noted. Ascorbic acid, Hg of electronic (99.9998%) or puratronic (or 99.999995%) grade were purchased from Alfa Aesar. Water (18.2 MΩ) was purified using Milli-Q system. N,N-Bis(2-pyridinylmethyl)-2,2'-bipyridine-6-methanamine (DPA-Bpy) was synthesized according to literature method (B. Radaram et al., *Inorg. Chem.* 2011, 50, 10564-10571).

2. Instrumentation

UV-vis absorption spectra were measured using a HP-8452A diode array spectrometer. ESI-MS spectra were obtained from ThermoElectron LCQ Advantage liquid chromatograph mass spectrometer. The formation of H$_2$ was determined by an HP 5890 series II Gas Chromatograph with a TCD detector (Molecular sieve 5 Å column). Photocatalytic reactions were carried out using an LED (Cree 3-Up XP-E) lamp at 450 nm. Elemental analyses were done by Atlantic Microlab, Inc, Atlanta, Ga. EPR spectra were recorded on a Varian-122 X-band spectrometer equipped with an Air Products Helitran cryostat and temperature controller at the Illinois Electron Paramagnetic Resonance Research Center of the University of Illinois.

Cyclic voltammetric measurements were performed with a CH Instruments potentiostat (Model 660) in 0.1 M TBAP in acetonitrile or 1.0 M pH 7.0 sodium phosphate buffer using glassy carbon working electrode, platinum wire counter electrode, and Ag/AgCl reference electrode. Controlled potential electrolysis was conducted in 1.0 M sodium phosphate buffer at pH 7 in an H-type gas-tight dual compartment cell. A mercury pool with a surface area of 4.9 cm$^2$ was used as working electrode, connected through a platinum wire placed at the bottom of the mercury pool. An aqueous Ag/AgCl reference electrode (BASi) was placed in electrolyte solution above mercury pool. A platinum gauze, used as auxiliary electrode, was placed in the other compartment partition from the solution of the working electrode. Both working and auxiliary compartments contained 22.5 mL electrolyte solutions, which were thoroughly degassed by purging with Ar for 30 min prior to each experiment. Faradaic efficiency was determined with 50 μM complex 2 at an applied potential of −1.3 and −1.4 V vs SHE. The volume of H$_2$ produced during electrolysis was determined by GC-TCD or measured by a gas buret. The experiments were performed at 22° C. and the vapor pressure of water at 22° C. (19.8 mmHg) was corrected in calculating the current efficiency of H$_2$ production.

3. General Procedure for Photocatalytic Hydrogen Production

For photoinduced hydrogen evolution, each sample was prepared in a 130 mL rectangular flask containing 10 mL of 1.0 M pH 4.0 acetate buffer in the presence of [Ru(bpy)$_3$]Cl$_2$ (0.5 mM), ascorbic acid (0.1 M), and complex 2 (5.0 μM). The solution was sealed with a septum, degassed under vacuum and flushed with Ar gas (with 5% CH$_4$ as internal standard) four times before irradiation. The samples were irradiated by a LED light (450 nm) at room temperature with constant stirring. The amounts of hydrogen evolved were determined by gas chromatography using a HP 5890 series II Gas Chromatograph with a TCD detector or measured by a gas burette placed in a circulated water bath maintained at 22° C.

II. Preparation and Experiments

Example 1

Synthesis and Characterization of Complex 1 and Complex 2

The reaction of CoCl$_2$.6H$_2$O with DPA-Bpy in refluxing CH$_3$CN results in a reddish cloudy solution. After filtration, the filtrate was dried under vacuum and washed with Et$_2$O to yield Co(DPA-Bpy)Cl$_2$ (complex 1) as a light-pink powder (Scheme 1).

Figure 4:
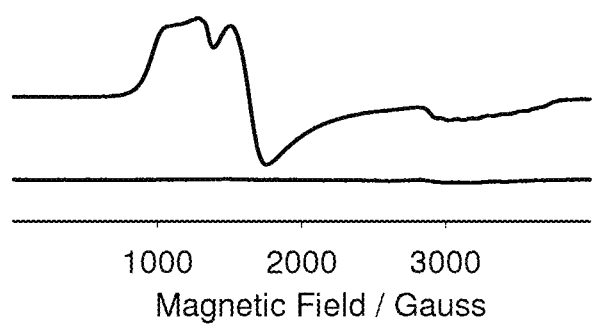
FIG. 4 is EPR spectra in water: (a) complex 1 and (b) complex 2. Samples were recorded in 2 mM aqueous solution containing 10% glycerol at 15 K and 15 dB microwave power; microwave frequency, 9.050 GHz.

Refluxing an aqueous solution of Complex 1 in the presence of AgPF$_6$ led to the formation of an aqua complex [Co(DPA-Bpy)(OH$_2$)](PF$_6$)$_3$ (complex 2). The oxidation of complex 1 by AgPF$_6$ led to the formation of complex 2, which showed an EPR-silent Co$^{III}$ center (FIG. 4b).

Scheme 1. Synthesis of 1 and 2.

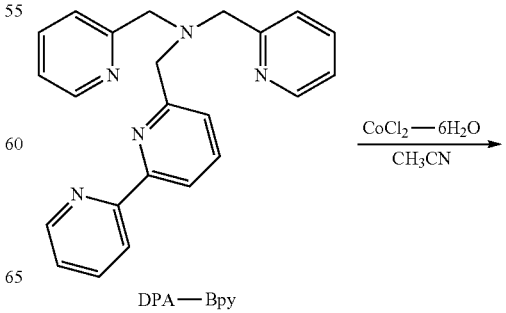

DPA—Bpy

-continued

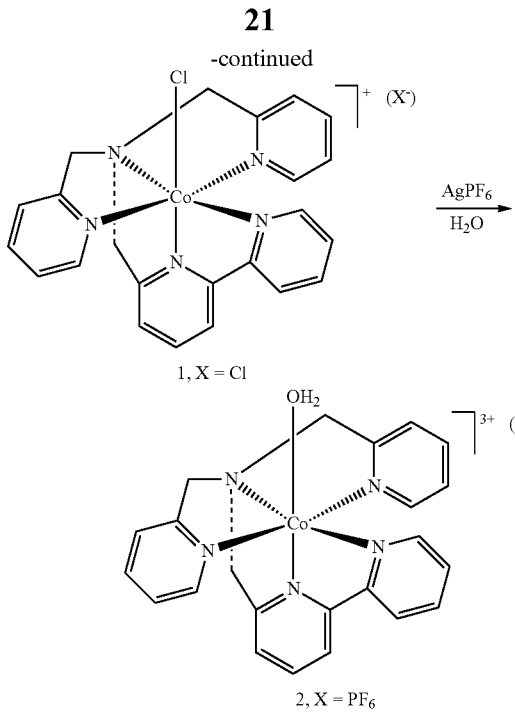

1, X = Cl

2, X = PF$_6$ a) Synthesis of [Co(DPA-Bpy)Cl]Cl (Complex 1) and Analysis

To a refluxed solution of CoCl$_2$.6H$_2$O (0.207 g, 1 mmol) in 10 mL CH$_3$CN was added dropwise a solution of 1-(2, 2'-bipyridin-6-methyl) N,N'-Bis(2-pyridyl methyl) amine (DPA-Bpy, 0.367 g, 1 mmol) in 5 mL CH$_3$CN for a period of 15 mins. The resulting cloudy solution was refluxed for 6 hrs and then filtered through a glass frit membrane. The filtrate was evaporated under reduced pressure, dissolved in minimum amount of CH$_3$CN, and washed with diethyl ether to yield the product as a light pink powder. Yield, 0.17 g (33%). Anal. Calcd for C$_{23}$H$_{21}$Cl$_2$CoN$_5$.(H$_2$O)$_{1.5}$: C, 52.69; H, 4.61; N, 13.36. Found: C, 52.52; H, 4.55; N, 13.33. ESI-MS: m/z$^+$461.1 (Calcd m/z$^+$ for [Co(DPA-Bpy)Cl]$^+$ 461.8).

Figure 2:
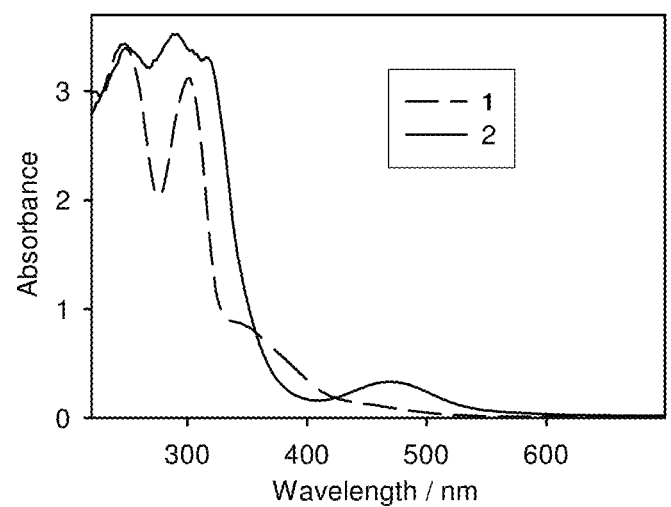
FIG. 2 is UV-visible spectra of complex 1 (dashed line) and complex 2 (solid line) in H$_2$O.

The crystal structure of the Co$^{III}$ form of complex 1 (FIG. 1) confirmed that DPA-Bpy serves as a pentadentate ligand with the Co center in a distorted octahedral geometry with two trans pyridines groups, similar to that of Ru(DPA-Bpy)Cl$_3$.[8] The UV-vis spectrum of Complex 1 in water shows two intense bands at 247 and 300 nm from ligand π→π* transitions, a shoulder peak at 337 nm, and a weak shoulder at 420 nm from metal d-d transition (FIG. 2). The EPR spectrum of complex 1 exhibited rhombic splitting pattern with g values of 5.56, 3.95, and 1.98, suggesting the presence of a high-spin Co$^{II}$ center (FIG. 4a).[9]

Figure 5:
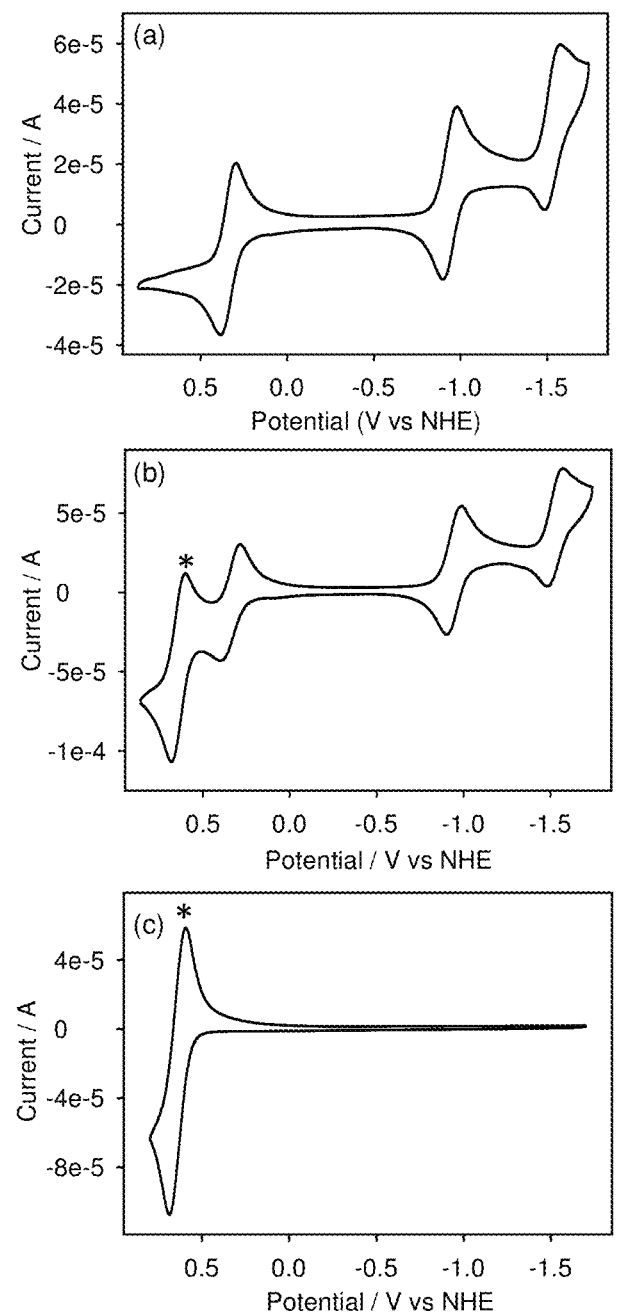
FIGS. 5a-c are cyclic voltammograms of (a) complex 1, (b) complex 1 and (c) DPA-Bpy ligand in the presence of ferrocene in CH$_3$CN solution, 0.1 M TBAP. Scan rate, 100 mV/s; working electrode, glassy carbon; reference electrode, Ag/AgCl; counter electrode, Pt wire. Ferrocene (*) was included as an internal reference (0.64 V vs SHE).

The cyclic voltammogram of complex 1 in CH$_3$CN displays three reversible redox potentials at 0.35, −0.94, and −1.53 V (vs SHE), assignable to Co$^{III/II}$, Co$^{II/I}$, and Co$^{I/0}$, respectively (FIGS. 5a and 5b). In the same region, ligand DPA-Bpy does not show any redox behaviour (FIG. 5c).

b) Synthesis of [Co(DPA-Bpy)(OH$_2$)](PF$_6$)$_3$ (Complex 2) and Analysis

To a solution of [Co(DPA-Bpy)Cl]Cl (0.2665 g, 0.54 mmol) in 15 mL H$_2$O was added dropwise a solution of AgPF$_6$ (0.4554 g, 1.8 mmol) in 10 mL of H$_2$O under Ar atmosphere. The reaction mixture was refluxed for 12 hrs. After the precipitate was filtered through celite, water was removed under reduced pressure and the residue was dissolved in minimum amount of methanol, washed with diethyl ether, and dried under vacuum to get the yellow solid [Co(DPA-Bpy)(OH$_2$)](PF$_6$)$_3$ (Complex 2) Yield: 0.39 g (88%). ESI-MS: m/z$^+$587.9 (Calcd m/z$^+$ for [Co(DPA-Bpy)(OH)(PF$_6$)]$^+$, 588.4). Anal. Calcd for C$_{23}$H$_{23}$CoF$_{18}$N$_5$OP$_3$.H$_2$O: C, 30.82; H, 2.70; N, 7.81. Found: C, 30.73; H, 2.81; N, 7.80.

Figure 3:
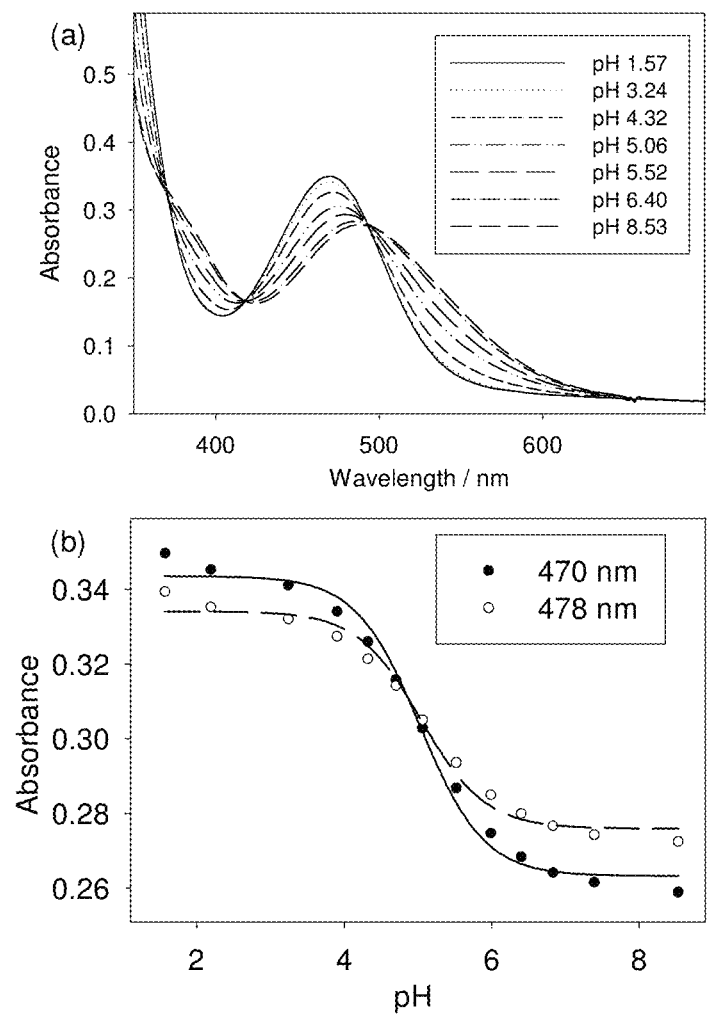
FIGS. 3a-b. (3a) UV-vis spectra change of complex 2 at varying pH; (3b) Absorbance change vs pH at 470 nm and 478 nm for complex 2. The best-fit lines from both 470 nm (solid line) and 478 nm (dashed line) yield a pK$_a$ of 5.0.

Compared to complex 1, complex 2 displays an absorption band at 470 nm from metal d-d transition (FIG. 2). The pK$_a$ of the coordinated H$_2$O in complex 2 was determined to be 5.0 by fitting the pH titration curve of complex 2 from pH 1 to 9 (FIG. 3).

Figure 6:
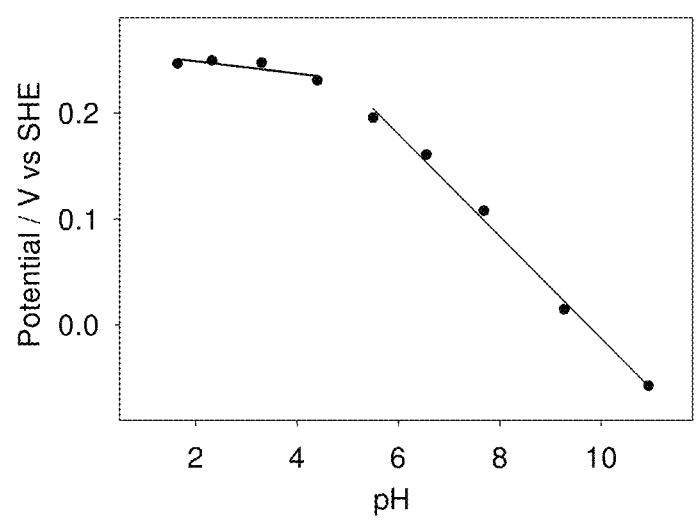
FIG. 6 is a pourbaix diagram for the Co$^{III/II}$ redox couple of complex 2 in aqueous Britton-Robinson buffer (E$_{1/2}$ vs SHE).

In 1.0 M sodium phosphate buffer at pH 7.0, complex 2 exhibits a sequence of two redox events centered at 0.15 and −0.90 V (vs SHE), corresponding to Co$^{III/II}$ and Co$^{II/I}$, respectively (FIG. 15). The Co$^{III/II}$ couple displays a pH-dependent redox potential change, with a slope of −48 mV/pH in the range of pH 5-8 (FIG. 6), suggesting a proton-coupled electron transfer process. However, the Co$^{III/II}$ couple only changes slightly over pH 1-5. The Pourbaix diagram of complex 2 is consistent with a pKa of 4.8 for the Co$^{III}$—OH$_2$ species, similar to that obtained from pH titration of complex 2.

Example 2

Synthesis of DPA-ABpy and Metal Complexes 3 and 4

To provide a possible H-bonding network to M-H species during H$_2$ production, an NMe$_2$- group was introduced into the DPA-Bpy scaffold (DPA-ABpy), which was synthesized based on the following Scheme 2.

Scheme 2. Synthesis of DPA—ABpy.

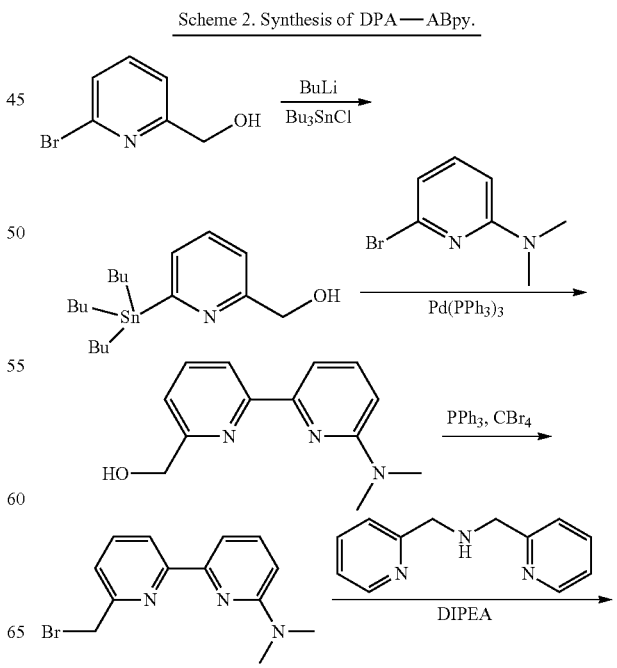

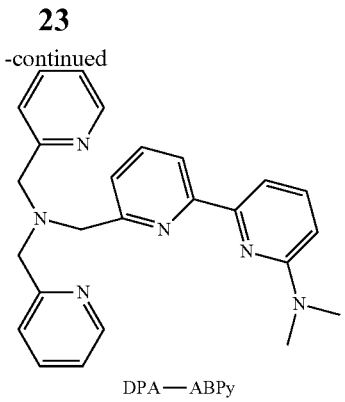

DPA—ABPy

The reaction of DPA-ABpy with $Ni(CH_3CN)_6(BF_4)_2$ and $Co(CH_3CN)_6(PF_6)_2$ in a mixed solution of acetone/$H_2O$ (1:9) results in the formation of $[Ni(DPA-ABpy)(H_2O)][BF_4]_2$ (complex 3) and $[Co(DPA-ABpy)][PF_6]_2$ (complex 4), respectively.

X-ray structural analysis of complexes complex 3 and complex 4 confirmed the coordination of DPA-ABpy to metal centers as a pentadentate ligand. While the Ni center in complex 3 is in an octahedral geometry, with the 6th ligand being a solvent molecular, the Co center in complex 4 adopts a triganol bipyramidal geometry (see FIG. 18*a* and FIG. 18*b*).

Example 3

Electrolysis

To evaluate the current efficiency of $H_2$ production, bulk electrolysis of 1.0 M phosphate buffer at pH 7 was carried out in the presence of complex 2 under room temperature at a potential of −1.4 V (vs SHE). The amounts of $H_2$ produced during electrolysis or photocatalysis were determined by gas chromatography using a HP 5890 series II Gas Chromatograph with a TCD detector (Molecular sieve 5 Å column) or measured volumetrically by a gas burette.

Figure 7:
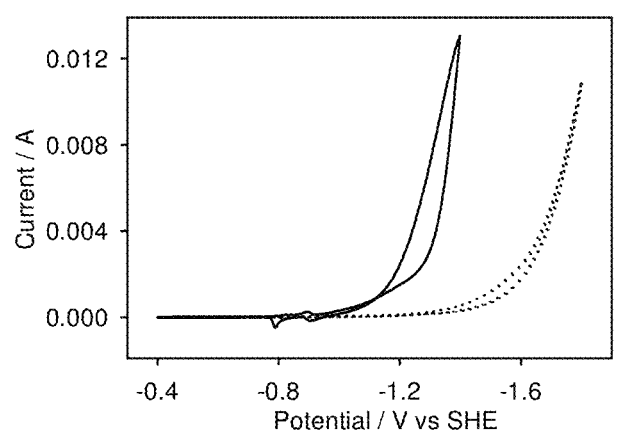
FIG. 7 are cyclic voltammograms of 1.0 M sodium phosphate buffer solution at pH 7.0 in the presence (solid line) and absence (dotted line) of 50 μM complex 2. Scan rate, 100 mV/s; working electrode, mercury pool; counter electrode, Pt mesh; reference electrode, aqueous Ag/AgCl.

When mercury pool was used as the working electrode, the cyclic voltammogram of 1.0 M sodium phosphate buffer at pH 7 showed no significant current at potentials more positive than −1.6 V vs SHE (FIG. 7). However, in the presence of complex 2, a strong current appeared at −1.20 V vs SHE concomitant with gas bubbles formation, which was confirmed to be $H_2$ by GC-TCD analysis (GC=gas chromatography, TCD=thermal conductivity detector). The study suggested that complex 2 is capable of catalyzing proton reduction to $H_2$ from neutral water.

Example 4

Control Potential Experiments

To determine the overpotential for proton reduction by complex 2, control potential experiments using an H-type electrochemical cell were performed. Controlled potential electrolysis was conducted in 1.0 M sodium phosphate buffer at pH 7 in an H-type gas-tight dual compartment cell. A mercury pool with a surface area of 4.9 $cm^2$ was used as working electrode that was connected through a platinum wire placed at the bottom of the mercury pool. The solution was stirred constantly during controlled potential electrolysis experiments.

A platinum gauze wire, used as auxiliary electrode, was placed in the other compartment partition from the solution of the working electrode. Aqueous Ag/AgCl electrode was used as the reference electrode. The working and auxiliary compartments both contained 22.5 mL of electrolyte solution, which were thoroughly degassed by purging with Ar for 30 min prior to the experiments. Faradaic efficiency was determined with 50 μM complex 2 at an applied potential of −1.3 and −1.4 V vs SHE. The experiments were performed at 22° C. and the vapor pressure of water at 22° C. (19.8 mmHg) was corrected in calculating the current efficiency of $H_2$ production.

Figure 8:
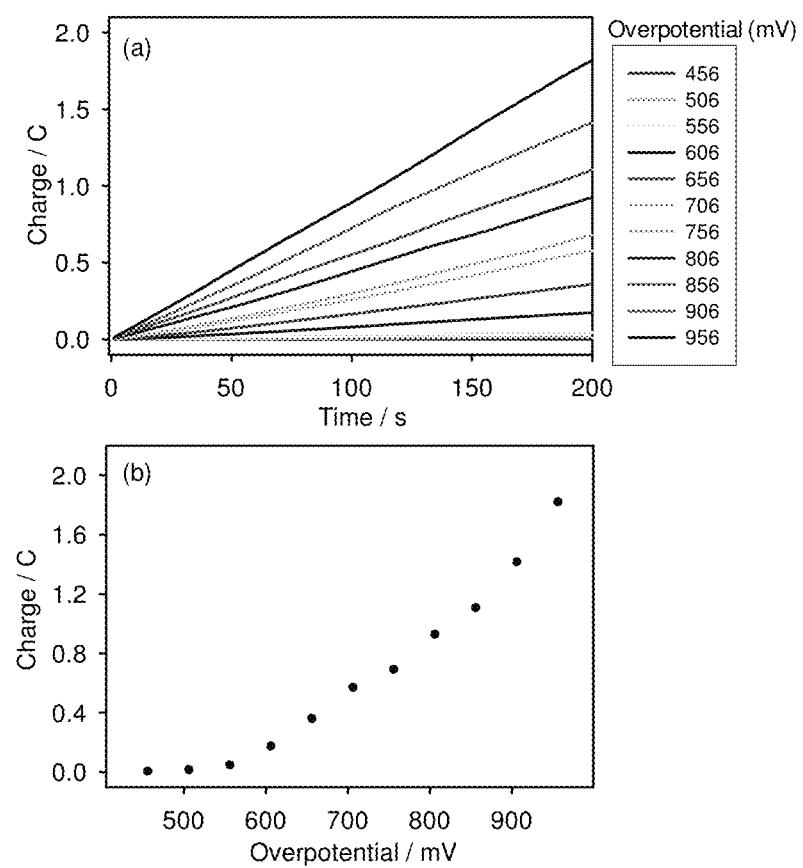
FIGS. 8a-b are charts showing charge build-up over (a) time (200 s) and (b) overpotential for the controlled potential electrolysis of 50 μM complex 2 in 1.0 M sodium phosphate buffer at pH 7.0.

FIG. 8 displays the charge build-up over 200-sec electrolysis at varied potentials for 50 μM complex 2 in 1.0 M phosphate buffer at pH 7. There is no significant charge consumption for overpotentials below −0.55 V, and the catalytic current for proton reduction occurs at an overpotential of −0.60 V (−1.01 V vs SHE), close to the $Co^{II/I}$ couple at −0.90 V (vs SHE).

For complex 2 in the range of 50 μM-1 mM, a current efficiency of 99±1% (Table 2) was obtained for $H_2$ evolution at pH 7 (Table 2).

TABLE 2

Experimental results from controlled-potential electrolysis on 2 in 1.0M phosphate buffer at pH 7

| | Sample Number | | | | | | | | |
|---|---|---|---|---|---|---|---|---|---|
| | 1 | 2 | 3 | 4 | 5 | 6 | 7 | 8 | 9 |
| Applied Potential, (V vs SHE) | −1.40 | −1.40 | −1.40 | −1.40 | −1.40 | −1.30 | −1.30 | −1.30 | −1.30 |
| Coulombs (C) | 22.2 | 22.1 | 28.0 | 28.2 | 63.6 | 20.3 | 24.0 | 31.1 | 42.4 |
| Calcd Volume of $H_2$ (mL) | 2.78 | 2.76 | 3.49 | 3.52 | 7.93 | 2.53 | 3.03 | 3.87 | 5.28 |
| Obs'd Volume Change (mL) | 2.8 | 2.8 | 3.5 | 3.6 | 8.2 | 2.6 | 3.0 | 3.9 | 5.3 |
| Expt $H_2$ Volume (mL) | 2.7 | 2.7 | 3.4 | 3.5 | 8.0 | 2.5 | 2.9 | 3.8 | 5.2 |
| Current Efficiency (%) | 98.6 | 98.9 | 97.6 | 99.6 | 100.7 | 100.1 | 96.4 | 98.1 | 97.8 |

Figure 9:
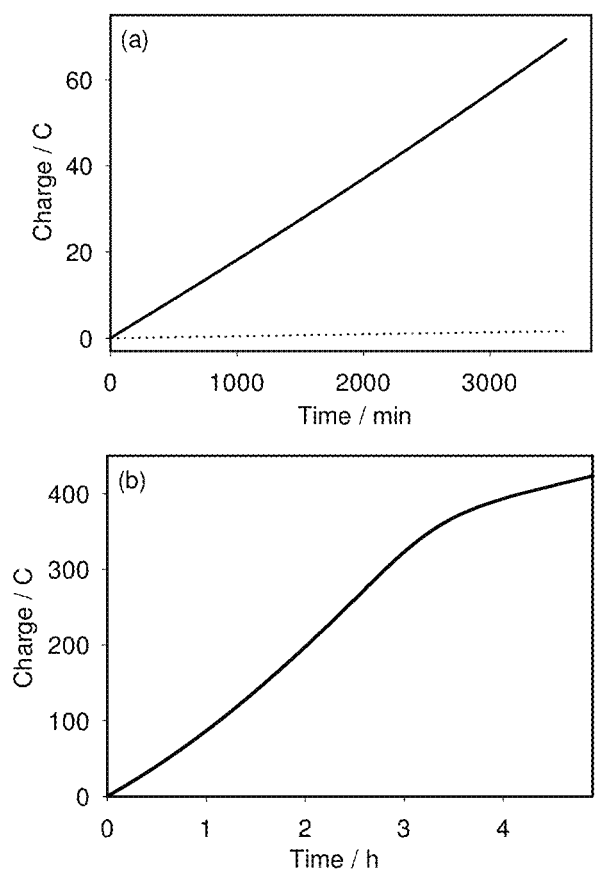
FIGS. 9a-b. present results of controlled potential electrolysis at −1.4 V (vs SHE). (a) In the presence (solid line)

When the controlled potential experiment was conducted at −1.3 V (vs SHE), the Faradaic efficiency was determined to be 98±2%. On the basis of consumed charges over 1 h bulk electrolysis at −1.4 V (vs SHE) in 1.0 M phosphate buffer at pH 7 in the presence of 50 μM complex 2, the $H_2$ evolution activity of complex 2 was calculated to be 1400 L $H_2$ (mol cat)$^{-1}$ h$^{-1}$(cm$^2$ Hg)$^{-1}$ (FIG. 9*a*), or a turnover number (TON) of >300 mol $H_2$ (mol cat)$^{-1}$, suggesting the reduced form of complex 2 is a highly efficient electrocatalyst for proton reduction in neutral aqueous solution. FIG. 9b also suggests that the activity of complex 2 decreased after more than 3 h electrolysis.

Catalytic $H_2$ production at a potential lower than the $Co^{II/I}$ couple of complex 2 suggested that $Co^I$ form of complex 2 is responsible for proton reduction (see Scheme 2).

Example 5

Photocatalytic $H_2$ Production

Photocatalytic $H_2$ production by complex 2 using ascorbic acid as electron donor and $[Ru(bpy)_3]^{2+}$ as photosensitizer was performed. Photolysis experiments were carried out in 10 mL 1.0 M acetate buffer solution at pH 4.0 containing 0.1 M ascorbic acid and 0.5 mM $[Ru(bpy)_3]^{2+}$. Each sample was prepared in a 130 mL rectangular flask containing 10 mL of buffer in the presence of $[Ru(bpy)_3]Cl_2$, ascorbic acid, and complex 2. The flask was sealed with a septum, degassed under vacuum, and flushed with Ar (with 5% $CH_4$) four times to remove any air present. Each sample was irradiated by an LED light (450 nm) at room temperature with constant stirring. The amounts of $H_2$ produced during photocatalysis were determined by gas chromatography using a HP 5890 series II Gas Chromatograph with a TCD detector (Molecular sieve 5 Å column) or measured volumetrically by a gas burette.

As shown in FIGS. 16 and 10a, formation of $H_2$ was observed upon photolysis (LED light at 450 nm) of the above pH 4 solution in the presence of 5.0 µM complex 2. The $H_2$ evolution process ceased in ~3 h, with a TON of >1600 mol $H_2$ (mol cat)$^{-1}$. However, nearly 90% of the $H_2$ evolved within the first hour of irradiation, corresponding to a turnover frequency (TOF) of 1500 mol $H_2$ (mol cat)$^{-1}$h$^{-1}$ (FIG. 16).

To determine the pH effects on $H_2$ evolution catalyzed by complex 2, light-induced $H_2$ evolution was performed in the pH range of 3-6 under the conditions described in FIG. 16. An optimum pH of 4.0 was observed for $H_2$ evolution (FIG. 11). The pH-dependent activity has been related to the pKa of ascorbic acid, since it is believed that ascorbic acid acts as both a proton and electron donor for $H_2$ production.

To explore the dependence of $H_2$ activity on the concentration of complex 2, photolysis experiments were conducted using different concentration of complex 2 (0.5-50 µM) at pH 4.0. As shown in FIG. 12, the concentration of complex 2 has a great influence on the light-induced $H_2$ evolution activity in terms of TON and TOF, which increased significantly at lower concentration of catalyst. At 50 µM complex 2, a TON of ~450 mol $H_2$ (mol cat)$^{-1}$ and TOF of 410 mol $H_2$ (mol cat)$^{-1}$h$^{-1}$ were obtained. However, at 1.0 µM complex 2, the TON and TOF increased drastically to 4400 mol $H_2$ (mol cat)$^{-1}$ and 4000 mol $H_2$ (mol cat)$^{-1}$h$^{-1}$, respectively. The dependence of TON and TOF on catalyst concentration indicates that the formation of binuclear or polynuclear species might be involved in the inactivation of complex 2.

Example 6

Control Photolysis Experiments

To identify factors responsible for the decomposition of photocatalytic $H_2$ evolution in the above system, one of the three components (ascorbic acid, $[Ru(bpy)_3]^{2+}$, or complex 2) was added to a reaction flask after the cessation $H_2$ evolution to see if $H_2$ production could be resumed.

Addition of any one of the three components, in the same amount as that used in photocatalytic reaction, resulted in no significant amount of $H_2$ formation, suggesting the decomposition of all three species occurred during photocatalytic $H_2$ evolution. Both complex 2 and photosensitizer need to be added to resume $H_2$ production, with ~37% more $H_2$ production (FIG. 14). The addition of both ascorbic acid and $[Ru(bpy)_3]^{2+}$ also led to an increase of $H_2$ evolution by ~10%.

However, no significant amount of $H_2$ was produced when both ascorbic acid and complex 2 were added, suggesting a complete decomposition of $[Ru(bpy)_3]^{2+}$ under the reaction conditions. The coordination of acetate ion to complex 2 or the substitution of bpy ligand in $[Ru(bpy)_3]^{2+}$ by acetate ion may contribute to the decomposition of photocatalytic system for $H_2$ evolution. Furthermore, the presence of trace amount of air in reaction flask may also lead to the decomposition of catalytic system. The amount of $H_2$ produced in the presence of air is only 40% of that produced when the $H_2$ evolution was conducted under Ar, suggesting $O_2$ does inhibit $H_2$ evolution.

Control experiments without ascorbic acid, $[Ru(bpy)_3]^{2+}$, or complex 2 showed no or only residual amounts of $H_2$ production, suggesting all three components are required for $H_2$ evolution (FIG. 10b).

When photolysis experiment was conducted at higher concentration of ascorbic acid (0.5 M) and $[Ru(bpy)_3]^{2+}$ (2.0 mM) with 5.0 µM complex 2, the TON increased further from 1600 to 2100 mol $H_2$ (mol cat)$^{-1}$, corresponding to a TOF of >1900 mol $H_2$ (mol cat)$^{-1}$h$^{-1}$ during the first hour irradiation (FIG. 13). The above studies demonstrated that the light-induced $H_2$ production catalyzed by complex 2 also depends on the concentrations of sacrificial reagent and photosensitizer and that the reduced form of complex 2 acts as a highly efficient photocatalyst for $H_2$ evolution.

Example 7

Structure Determination

The suitable crystals for X-ray crystallography of the $Co^{III}$ form of complex 1 were grown from a solution of complex 1 in $CH_3CN/CH_2Cl_2$ (1:1) in air. The crystal was flash cooled to 100 K for X-ray analysis on a Bruker D8 diffractometer 3-circle diffractometer with fixed $\chi$. The crystal was illuminated with the X-ray beam from a FR-591 rotating-anode X-ray generator equipped with a copper anode and Helios focusing mirrors. The resulting images were integrated with the Bruker SAINT software package using a narrow-frame algorithm.

The structure was solved and refined via the Bruker SHELXTL software package, using the space group P-1, with Z=2 for the formula unit, $C_{25.38}H_{24.76}Cl_{3.76}CON_6$. Hydrogen atoms were located in difference electron density maps and refined freely as isotropic contributors. The final anisotropic full-matrix least-squares refinement converged at R1=4.78% for the observed data and wR2=12.36% for all data. The crystals also contain a small region of disordered solvent that could not be well resolved. The disposition of the electron density in that region strongly suggests two chlorine atoms of a methylene chloride molecule at approximately 40% occupancy, but the corresponding carbon atom could not be located. The disordered region was treated with the help of the SQUEEZE program, therefore no atoms are modeled there. SQUEEZE's estimate of 32 electrons per asymmetric unit in the disordered area is consistent with methylene chloride at 38% occupancy and the formulae and derived parameters reported herein reflect that interpretation.

The crystal structure has been deposited at the Cambridge Crystallographic Data Centre with the deposition number: CCDC 860449, the chemical and crystal data of which is presented in Table 3:

TABLE 3

Chemical and Crystal Data of [Co(DPA-Bpy)(Cl)]Cl$_2$•(CH$_3$CN) (CCDC 860449)

| Formula | C$_{25.38}$H$_{24.76}$Cl$_{3.76}$CoN$_6$ |
|---|---|
| Mol. wt. | 606.05 |
| Crystal system | Triclinic |
| Space group | P-1 |
| a (Å) | 9.2901 (2) |
| b (Å) | 11.1802 (2) |
| c (Å) | 13.9726 (3) |
| α/° | 70.0560 (10) |
| β/° | 81.9510 (10) |
| γ/° | 74.7420 (10) |
| V (Å$^3$) | 1314.12 (5) |
| Z | 2 |
| Density (g/cm$^3$) | 1.532 |
| Abs. coeff. (mm$^{-1}$) | 8.857 |
| Abs. correction | multi-scan |
| F(000) | 620 |
| Total no. of reflection | 15946 |
| Reflections, I > 2σ(I) | 4474 |
| Max. 2θ/° | 71.540 |
| Ranges (h, k, l) | −11 ≤ h ≤ 10 |
| | −13 ≤ k ≤ 11 |
| | −17 ≤ l ≤ 17 |
| Complete to 2θ (%) | 95.0 |
| Data/restraints/parameters | 4874/0/412 |
| Goof (F2) | 1.050 |
| R indices [I > 2σ(I)] | 0.0478 |
| R indices (all data) | 0.0514 |
| wR$_2$ indices | 0.1236 |

Example 8

The H$_2$ Evolution Activity of Complex 3

The H$_2$ evolution activity of complex 3 was investigated in a mixed solvent of EtOH/H$_2$O (1:1) under irradiation (LED light, 520 nm) containing 5 μM complex 3, 2 mM FL, and 10% TEA, with a TON of 2000 mol H$_2$ (mol cat)$^{-1}$ after 30 h photolysis, ~25% more than that of [Ni(DPA-Bpy)(H$_2$O)](BF$_4$)$_2$ under the same conditions.

Example 9

Water Oxidation by a Mononuclear Ruthenium Complex with a Pentadentate Isoquinoline-Bipyridyl Ligand Compared to pyridine, isoquinoline is more electron-withdrawing ligand. To provide insights into the electronic effect isoquinoline on the oxidation of water, we replaced the pyridine groups in (N,N-bis(2-pyridinylmethyl)-2,2'-bipyridine-6-methanamine) (DPA-Bpy) to afford a new type of pentadentate ligand, N,N-bis((isoquinolin-1-yl)methyl)(6-(pyridin-2-yl)pyridin-2-yl)methanamine (DIQ-Bpy). Here, we report the synthesis, characterization, and activity studies of Ru complexes supported by DIQ-Bpy.

Synthesis and Characterization

Scheme 3. Synthesis of DIQ—Bpy Ligand and Ru-complexes.

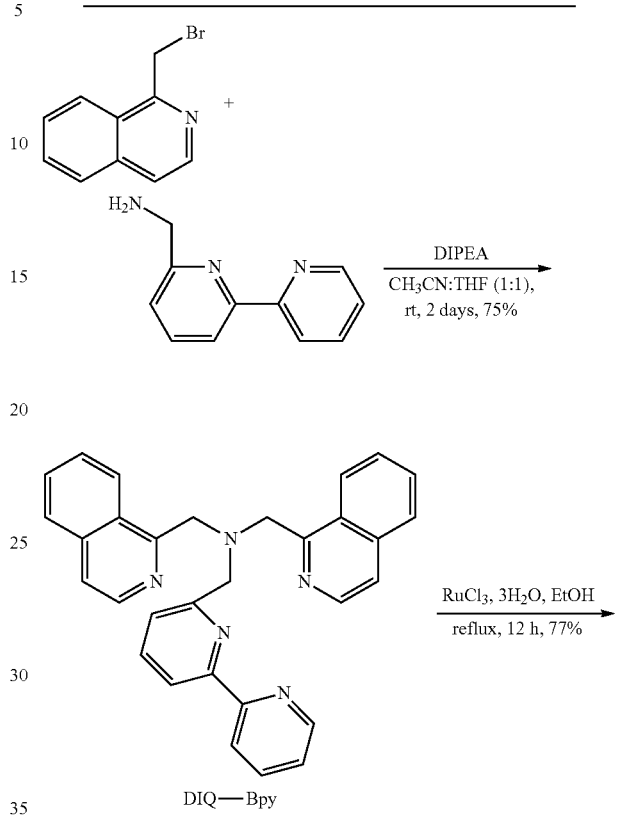

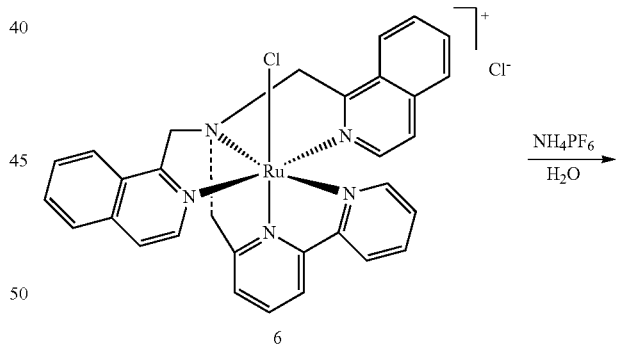

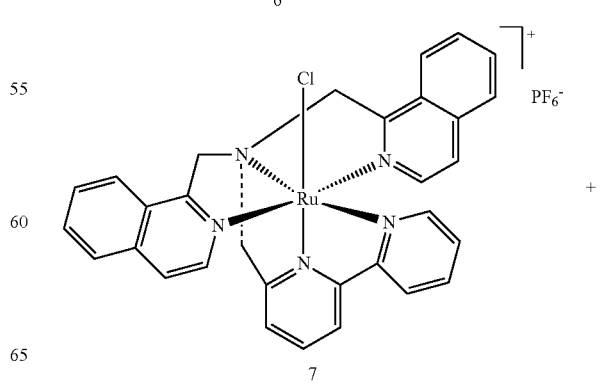

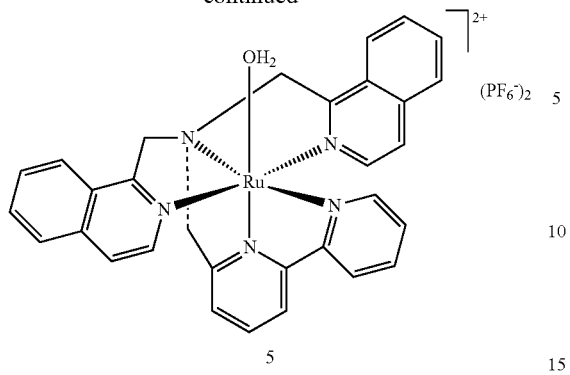

5

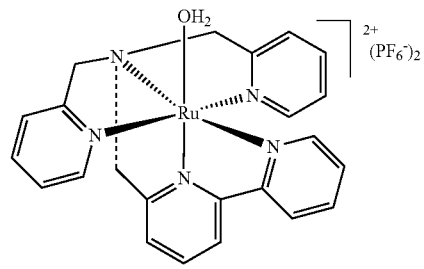

5

The DIQ-Bpy ligand was synthesized following an analogous procedure used for the synthesis of DPA-Bpy (Scheme 3), from the reaction of 1-(bromomethyl)isoquinoline with (6-(pyridin-2-yl)pyridin-2-yl)methanamine in the presence of base (Y. Hirai, T. Kojima, Y. Mizutani, Y. Shiota, K. Yoshizawa, S. Fukuzumi, Angew. Chem., Int. Ed. 2008, 47, 5772-5776). Slow addition of an ethanol solution of DIQ-Bpy to a refluxed solution of $RuCl_3 \cdot 3H_2O$ in ethanol resulted in the formation of [Ru(DIQ-Bpy)(Cl)]Cl (6). The addition of saturated solution of $NH_4PF_6$ to an aqueous solution of complex 7 led to partial substitution of the coordinated Cl-ion in 6 with $H_2O$, resulting in the formation of a mixture of complexes $[Ru(DIQ-Bpy)(Cl)](PF_6)$ (7) and $[Ru(DIQ-Bpy)(H_2O)](PF_6)_2$ (5). Because of the different solubility of complexes 7 and 5 in methanol, the more soluble complex 5 was separated using a minimum amount of methanol from complex 7. $^1H$ NMR, mass spectrometry, and elemental analysis all confirmed the identity and purity of DIQ-Bpy ligand and Ru complexes 5-7.

The DIQ-Bpy ligand and Ru complexes have been characterized by 1D and 2D NMR experiments. The $^1H$ NMR spectrum of complex 5 (shows the two isoquinoline groups with the same NMR features, suggesting the presence of $C_s$ symmetry for 5 in solution with a plane containing the tertiary amine and the bipyridine group. Such structural feature of 5 is similar to that of Ru complex with DPA-Bpy ligand and consistent with the optimized structure from DFT calculation (FIG. 19) (B. Radaram, J. A. Ivie, R. M. Grudzien, J. H. Reibenspies, C. E. Webster, X. Zhao, Inorg. Chem. 2011, 50, 10564-10571; a) M. B. Hall, R. F. Fenske, Inorg. Chem. 1972, 11, 768-775; b) B. E. Bursten, J. R. Jensen, R. F. Fenske, J. Chem. Phys. 1978, 68, 3320-3321). The coordination of Ru resulted in the downfield shifts of all three methylene groups and H12-15 in both complexes 6 and 5 when compared to free DIQ-Bpy ligand. The substitution of Cl$^-$ ion in complex 6 with a $H_2O$ molecular is clearly observed from the $^1H$ NMR chemical shift at H15 from 9.56 ppm (6) to 9.30 ppm (5).

The UV-vis spectra of complexes 6 and 5 in dichloromethane are shown in FIG. 20. Complex 6 displayed a strong absorption at 497 nm and a weak band at 362 nm, while the corresponding bands shifted to 457 nm and 334 nm, respectively, in complex 5, consistent with the replacement of weak-field Cl$^-$ ion with water molecule.

Electrochemistry

The electrochemical properties of complex 5 were investigated at both pH 7 and pH 1. In a phosphate buffer at pH 7, complex 5 displays two reversible redox processes at 0.61 V and 0.80 V (vs SHE), assignable to $Ru^{III/II}$ and $Ru^{IV/III}$, respectively (FIG. 21). The redox potentials for the $Ru^{III/II}$ and $Ru^{IV/III}$ couples of 5 are similar to those reported for complex A (B. Radaram, J. A. Ivie, R. M. Grudzien, J. H. Reibenspies, C. E. Webster, X. Zhao, Inorg. Chem. 2011, 50, 10564-10571, incorporated herein by reference).

Complex A

In 0.1 M $HNO_3$, three redox events were observed for complex 5 at 0.87, 1.26, and 1.87 V (vs SHE), assigned to $Ru^{III/II}$, $Ru^{IV/III}$, and $Ru^{V/IV}$, respectively (Figures Ca and Cb). While the redox potentials of $Ru^{III/II}$ and $Ru^{IV/III}$ couples of 5 are close to those of complex A in 0.1 M $HNO_3$, there is a significant increase for the $Ru^{V/IV}$ couple compared to that (1.75 V vs SHE) of complex 5 (B. Radaram, J. A. Ivie, R. M. Grudzien, J. H. Reibenspies, C. E. Webster, X. Zhao, Inorg. Chem. 2011, 50, 10564-10571). In the presence of complex 5, the increase in anodic current at a potential higher than 1.5 V indicated that a high-valent $Ru^{IV}=O$ or higher oxidation state may be responsible for the catalytic oxidation of water.

Theoretical calculations of redox potentials of Ru complexes have been carried out to provide insights into the electronic effects of ligand. As shown in Table 1, the computed redox potentials for $Ru^{III/II}$, $Ru^{IV/III}$, and $Ru^{V/IV}$ couples of complex 5 are underestimated when compared to the experimental values.

TABLE 1

Experimental and Computed Redox Potentials of 5 at pH 1 (0.1M $HNO_3$) and pH 7 (Phosphate Buffer), $E_{1/2}$, V vs SHE.

| | $Ru^{III/II}$ | $Ru^{IV/III}$ | $Ru^{V/IV}$ |
|---|---|---|---|
| pH = 1 | 0.87 | 1.26 | 1.87 |
| pH = 7 | 0.61 | 0.80 | NA |
| $H_2O^a$ | 0.24 | 0.47 | 1.13 |

$^a$Computed redox potential.

Water Oxidation Studies

The oxygen evolution activity of complex 5 was investigated using cerium ammonium nitrate (CAN) as the oxidant ($2H_2O + 4Ce^{IV} \rightarrow O_2 + 4H^+ + 4Ce^{III}$). As shown in FIG. 22, the addition of excess $Ce^{IV}$ solution to a solution of complex 5 in 1.0 M $HNO_3$ (3 mL) resulted in the evolution of oxygen, which has been confirmed by gas chromatography. The evolution of oxygen ceased after 30 min with a turnover number of 2.8. Compared to the water oxidation activity of complex A, the introduction of isoquinoline group in complex 5 resulted in lower activity in water oxidation. This low activity may result from the higher redox potential of complex 5 (1.87 V vs SHE for $Ru^{V/IV}$) compared to that of complex A (1.75 V vs SHE for $Ru^{V/IV}$).

The formation of high-valent Ru=O species has been suggested as a key intermediate in the oxidation of water. As shown in FIG. 21b, the electrocatalytic oxidation of water to $O_2$ occurs at a potential higher than 1.5 V (1.84 V vs SHE), suggesting that a high-valent RuV=O or higher oxidation state may be responsible for water oxidation (Scheme 4). Because of the electron withdrawing isoquinoline groups in complex 5, the higher redox potential of $Ru^{V/IV}$ couple in 3 makes the oxidation of $Ru^{IV}$ to $Ru^{V}$ less efficient by $Ce^{IV}$. Although it has been demonstrated that electron-withdrawing groups such as isoquinoline could induce higher activity for water oxidation, the relatively activity of metal complexes also depends on the redox potentials and the accessibility of higher oxidation states responsible for water oxidation.

Scheme 4.
Proposed Mechanism for Water Oxidation by Mononuclear Ru Complex.

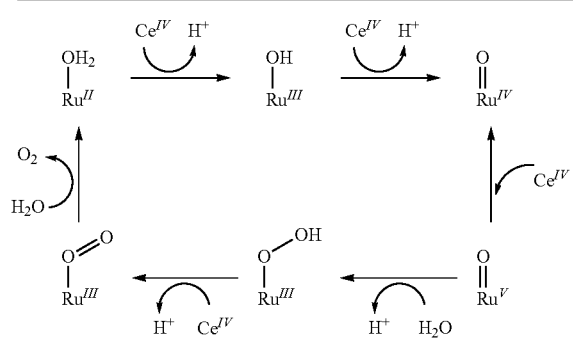

Conclusions

We have synthesized and characterized mononuclear Ru complexes with a pentadentate ligand, DIQ-Bpy. Compared to Ru complex with DPA-Bpy, the substitution of pyridines in DPA-Bpy with isoquinoline groups in DIQ-Bpy resulted in lower activity for water oxidation when using $Ce^{IV}$ as chemical oxidant. The relative lower activity for the oxidation of water could result from the higher potential of the $Ru^{V/IV}$ couple, making the formation of high-valent RuV=O species less accessible by $Ce^{IV}$.

Experimental Details

Materials and Synthesis

All chemicals were purchased from Sigma-Aldrich and Alfa-Aesar except noted. Other reagents such as 1-methyl isoquinoline, $RuCl_3.3H_2O$, $(NH_4)_2Ce(NO_3)_6$, and 2,2'-dipyridyl were used as received without further purification. Milli-Q $H_2O$ (18.2 MΩ) was used in all experiments. Syntheses of bromomethyl isoquinline and 6-(aminomethyl)-2,2'-bipyridine were carried out following literature methods ((a) Z. Tyeklar, R. R. Jacobson, N. Wei, N. N. Murthy, J. Zubieta, K. D. Karlin, J. Am. Chem. Soc. 1993, 115, 2677-2689; b) Y. Gultneh, T. B. Yisgedu, Y. T. Tesema, R. J. Butcher, Inorg. Chem. 2003, 42, 1857-1867; c) T. Murashima, S. Tsukiyama, S. Fujii, K. Hayata, H. Sakai, T. Miyazawa, T. Yamada, Org Biomol Chem 2005, 3, 4060-4064)).

Synthesis of N,N-bis((isoquinolin-1-yl)methyl)(6-(pyridin-2-yl)pyridin-2-yl)methanamine (DIQ-Bpy)

To a solution of (6-(pyridin-2-yl)pyridin-2-yl)methanamine (0.25 g, 1.35 mmol) and 1-(bromomethyl)isoquinoline (0.75 g, 3.37 mmol) in acetonitrile (10 mL) was added di-isopropyl ethyl amine (0.69 mL, 3.98 mmol) at room temperature. The reaction mixture was stirred at room temperature, and the reaction progress was monitored by TLC. Upon completion of the reaction (~2 days), water (50 mL) was added. The product was extracted into ethyl acetate (3×50 mL) and washed with brine (2×30 mL). The combined organic layers were dried over anhydrous $Na_2SO_4$, filtered, evaporated under reduced pressure, and then purified by column chromatography (basic alumina) using 60% ethylacetate in hexanes as eluent to afford the compound as light yellow solid. Recrystallization in hot ether yielded a white solid (0.47 g, 75%). $^1H$ NMR ($CDCl_3$, 500 MHz): δ 3.99 (s, 2H, bipyridyl methylene-H8), δ 4.41 (s, 4H, isoquinoline methylene, H1), 7.08 (d, J=6.7 Hz, 1H, bpy-H9), 7.1 (t, J=7.3 Hz, 1H, iq-H3), 7.29 (td, J=4.6, 5.9 Hz, 1H, bpy-H14), 7.54 (d, J=5.6 Hz, 2H, iq-H6), 7.56 (t, J=7.7 Hz, 1H, iq-H4), 7.64 (t, J=7.7 Hz, 1H, bpy-H10), 7.75 (d, J=8.2 Hz, 2H, iq-H5), 7.78 (t, J=7.7 Hz, 1H, bpy-H13), 7.89 (d, J=8.4 Hz, 2H, iq-H2), 8.23 (d, J=7.7 Hz, 1H, bpy-H11), 8.39 (d, J=8.0 Hz, 1H, bpy-H12), 8.45 (d, J=5.6 Hz, 2H, iq-H7), 8.66 (d, J=4.6 Hz, 1H, bpy-H15). ESI-MS: $m/z^+$ 468.3 (calcd m/z+ for $[M+1]^+$ 468.2. Anal. Calcd for $C_{31}H_{26}N_5O_{0.5}$: C, 78.13; H, 5.50; N, 14.70. Found: C, 78.37; H, 5.41; N, 14.68.

Synthesis of $[Ru(DIQ-Bpy)(Cl)]Cl.(H_2O)_{2.5}$ (6)

A solution of DIQ-Bpy (0.30 g, 0.64 mmol) in 50 mL of ethanol was added dropwise to a solution of $RuCl_3.3H_2O$ (0.167 g, 0.64 mmol) in 80 mL of ethanol that has been refluxed for 30 min over a period of 30 min under argon atmosphere. The reaction mixture was then refluxed for 12 h. After filtration through Celite, the filtrate was evaporated under reduced pressure. The residue was dissolved in a minimum soluble amount of methanol and washed with diethylether (~70 mL) for 3-4 times to yield a dark red solid (0.34 g, Yield, 77%). $^1H$ NMR ($CD_3CN$, 500 MHz): δ 5.08 (s, 2H, bipyridyl methylene-H8), 5.59 (d, J=15.6 Hz, 2H, axial isoquinoline methylene-H1), 5.96 (d, J=15.6 Hz, 2H, equitorial isoquinoline methylene-H1), 7.06 (d, J=6.4 Hz, 2H, iq-H6), 7.11 (d, J=8.0 Hz, 1H, bpy-H9), 7.42 (d, J=6.4 Hz, 2H, iq-H7), 7.55 (t, J=8.0 Hz, 1H, bpy-H10), 7.77 (dd, J=1.8, 4.0 Hz, 2H, iq-H5), 7.78 (dd, J=1.4, 3.8 Hz, 2H, iq-H2), 7.86 (t, J=6.2 Hz, 2H, iq-H3), 7.87 (t, J=5.5 Hz, 1H, bpy-H14), 8.14 (d, J=5.5 Hz, 1H, bpy-H11), 8.15 (t, J=6.5 Hz, 2H, iq-H4), 8.19 (t, J=8.2 Hz, 1H, bpy-H13), 8.50 (d, J=8.2 Hz, 1H, bpy-H12), 9.56 (d, J=5.5 Hz, 1H, bpy-H15). ESI-MS: $m/z^+$ 604.1 (calcd $m/z^+$ for $[M-Cl^-]^+$ 604.08). Anal. Calcd for $C_{31}H_{30}Cl_2N_5O_{2.5}Ru$:C, 54.39; H, 4.42; N, 10.23. Found: C, 54.70; H, 4.34; N, 10.24. Absorption maxima ($CH_2Cl_2$) ($\lambda_{max}$): 497 nm, 362 nm.

Synthesis of $[Ru(DIQ-Bpy)(Cl)](PF_6).H_2O$ (7)

A solution of 6 (0.30 g, 0.13 mmol) in water (50 mL) was stirred for 1 h and the solution was cooled to 0° C. before addition of a saturated solution of $NH_4PF_6$ in water (5 mL). The resulting precipitate was filtered, washed with ice cold water, and dried to get a red solid (0.32 g). The red solid (100 mg) was dissolved in minimum amount of methanol (1 mL), sonicated (5 min), and centrifuged (15 min). The precipitate obtained from centrifugation was washed with methanol again and dried to yield $[Ru(DIQ-Bpy)Cl](PF_6).H_2O$ (7) as a dark red solid (0.047 g, 42%). ESI-MS: m/z 604.1 (calcd $m/z^+$ for $[M\ Cl^-]^+$ 604.09). Anal. Calcd for $C_{31}H_{27}ClF_6N_5OPRu$: C, 48.54; H, 3.38; N, 9.13. Found: C, 48.70; H, 3.38; N, 9.28.

Synthesis of $[Ru(DIQ-Bpy)(H_2O)](PF_6)_2$ (5)

The methanol solution from centrifugation during the synthesis of complex 7 was concentrated and washed with diethyl ether, and dried under reduced pressure to get [Ru(DIQ-Bpy)(H$_2$O)](PF$_6$)$_2$.H$_2$O (5) (0.045 g, 35%) as a red powder. $^1$H NMR (CD$_3$CN, 500 MHz): δ 5.14 (s, 2H, bipyridyl methylene-H8), 5.45 (d, J=16.2 Hz, 2H, axial isoquinoline methylene-H1), 6.1 (d, J=16.2 Hz, 2H, equitorial isoquinoline methylene-H1), 7.14 (d, J=6.0 Hz, 2H, iq-H6), 7.21 (d, J=7.8 Hz, 1H, bpy-H9), 7.55 (d, J=6.0 Hz, 2H, iq-H7), 7.76 (t, J=7.8 Hz, 1H, bpy-H10), 7.87 (J=4.0 Hz, 2H, iq-H2), 7.85 (J=4.0 Hz, 2H, iq-H5), 7.91 (t, J=7.8 Hz, 1H, bpy-H14), 7.94 (t, J=2.8 Hz, 2H, iq-H3), 8.21 (d, J=Hz, 2H, iq-H4), 8.28 (d, J=7.8 Hz, 1H, bpy-H11), 8.30 (t, J=7.8 Hz, 1H, bpy-H13), 8.60 (d, J=8.0 Hz, 1H, bpy-H12), 9.30 (d, J=4.7 Hz, 1H, bpy-H15). ESI-MS: m/z$^+$713.6, (calcd m/z$^+$ for [M-H$_2$O—PF$_6$]$^+$ 713.6). Anal. Calcd for C$_{31}$H$_{27}$F$_{12}$N$_5$OP$_2$Ru: C, 42.48; H, 3.10; N, 7.99. Found: C, 42.32; H, 3.29; N, 8.04. Absorption maxima (CH$_2$Cl$_2$) ($\lambda_{max}$): 457 nm, 334 nm.

Characterization Methods

UV-vis absorption spectra were measured in dichloromethane at room temperature using a HP-8452A diode array spectrometer. $^1$H NMR spectroscopy was conducted on a Varian Direct Drive 500 MHz spectrometer. Cyclic voltammetric measurements were performed in 1.0 M pH 7 phosphate buffer and 0.1 M HNO$_3$ using a glassy carbon electrode, a platinum wire counter electrode, and a Ag/AgCl reference electrode. Oxygen evolution reaction measurements were performed using a calibrated O$_2$ electrode (YSI 5300A). Elemental analyses were conducted by Atlantic Microlab, Inc., Atlanta, Ga. Mass spectrometry was performed using LCQ Advantage liquid chromatography mass spectrometer.

The examples as above presented are not intended to limit the scope of what the inventors regard as their invention.

Further, all the documents mentioned in this disclosure are incorporated herein by reference in their entirety.

REFERENCES

[1] a) N. S. Lewis, D. G. Nocera, *Proc. Natl. Acad. Sci. U.S.A.* 2006, 103, 15729-15735; b) V. Balzani, A. Credi, M. Venturi, *Chem Sus Chem* 2008, 1, 26-58; c) J. Barber, *Biochem. Soc. Trans.* 2006, 34, 619-631; d) O. Kruse, J. Rupprecht, J. H. Mussgnug, G. C. Dismukes, B. Hankamer, *Photochem. Photobiol. Sci.* 2005, 4, 957-970.

[2] a) P. V. Bernhardt, L. A. Jones, *Inorg. Chem.* 1999, 38, 5086-5090; b) X. Hu, B. S. Brunschwig, J. C. Peters, *J. Am. Chem. Soc.* 2007, 129, 8988-8998; c) C. Baffert, V. Artero, M. Fontecave, *Inorg. Chem.* 2007, 46, 1817-1824; d) J. P. Bigi, T. E. Hanna, W. H. Harman, A. Chang, C. J. Chang, *Chem. Commun.* 2010, 46, 958-960; e) Y. Sun, J. P. Bigi, N. A. Piro, M. L. Tang, J. R. Long, C. J. Chang, *J. Am. Chem. Soc.* 2011, 133, 9212-9215; f) P.-A. Jacques, V. Artero, J. Pécaut, M. Fontecave, *Proc. Natl. Acad. Sci. U.S.A.* 2009, 106, 20627-20632; g) J. L. Dempsey, B. S. Brunschwig, J. R. Winkler, H. B. Gray, *Acc. Chem. Res.* 2009, 42, 1995-2004; h) W. R. McNamara, Z. Han, P. J. Alperin, W. W. Brennessel, P. L. Holland, R. Eisenberg, *J. Am. Chem. Soc.* 2011, 133, 15368-15371; i) V. Artero, M. Chavarot-Kerlidou, M. Fontecave, *Angew. Chem., Int. Ed.* 2011, 50, 7238-7266; j) R. M. Kellett, T. G. Spiro, *Inorg. Chem.* 1985, 24, 2373-2377; k) G. M. Jacobsen, J. Y. Yang, B. Twamley, A. D. Wilson, R. M. Bullock, M. Rakowski DuBois, D. L. DuBois, *Energy Environ. Sci.* 2008, 1, 167-174; l) E. S. Wiedner, J. Y. Yang, W. G. Dougherty, W. S. Kassel, R. M. Bullock, M. R. DuBois, D. L. DuBois, *Organometallics* 2010, 29, 5390-5401; m) C. Creutz, N. Sutin, *Coord. Chem. Rev.* 1985, 64, 321-341; n) N. Sutin, C. Creutz, E. Fujita, *Comments Inorg. Chem.* 1997, 19, 67-92.

[3] a) J. P. Collin, A. Jouaiti, J. P. Sauvage, *Inorg. Chem.* 1988, 27, 1986-1990; b) M. Rakowski Dubois, D. L. Dubois, *Acc. Chem. Res.* 2009, 42, 1974-1982; c) A. Le Goff, V. Artero, B. Jousselme, P. D. Tran, N. Guillet, R. Métayé, A. Fihri, S. Palacin, M. Fontecave, *Science* 2009, 326, 1384-1387; d) U. J. Kilgore, J. A. S. Roberts, D. H. Pool, A. M. Appel, M. P. Stewart, M. R. DuBois, W. G. Dougherty, W. S. Kassel, R. M. Bullock, D. L. DuBois, *J. Am. Chem. Soc.* 2011, 133, 5861-5872; e) M. L. Helm, M. P. Stewart, R. M. Bullock, M. R. DuBois, D. L. DuBois, *Science* 2011, 333, 863-866.

[4] a) G. A. N. Felton, A. K. Vannucci, J. Chen, L. T. Lockett, N. Okumura, B. J. Petro, U. I. Zakai, D. H. Evans, R. S. Glass, D. L. Lichtenberger, *J. Am. Chem. Soc.* 2007, 129, 12521-12530; b) M. Y. Darensbourg, E. J. Lyon, X. Zhao, I. P. Georgakaki, *Proc. Natl. Acad. Sci. U.S.A.* 2003, 100, 3683-3688; c) C. Tard, X. Liu, S. K. Ibrahim, M. Bruschi, L. D. Gioia, S. C. Davies, X. Yang, L.-S. Wang, G. Sawers, C. J. Pickett, *Nature* 2005, 433, 610-613; d) L. Sun, B. Åkermark, S. Ott, *Coord. Chem. Rev.* 2005, 249, 1653-1663; e) S. Kaur-Ghumaan, L. Schwartz, R. Lomoth, M. Stein, S. Ott, *Angew. Chem., Int. Ed.* 2010, 49, 8033-8036; f) R. Mejia-Rodriguez, D. Chong, J. H. Reibenspies, M. P. Soriaga, M. Y. Darensbourg, *J. Am. Chem. Soc.* 2004, 126, 12004-12014; g) F. Gloaguen, J. D. Lawrence, T. B. Rauchfuss, *J. Am. Chem. Soc.* 2001, 123, 9476-9477; h) F. Wang, W.-G. Wang, X.-J. Wang, H.-Y. Wang, C.-H. Tung, L.-Z. Wu, *Angew. Chem., Int. Ed.* 2011, 50, 3193-3197; i) P. Poddutoori, D. T. Co, A. P. S. Samuel, C. H. Kim, M. T. Vagnini, M. R. Wasielewski, *Energy Environ. Sci.* 2011, 4, 2441-2450; j) W. M. Singh, D. Pegram, H. Duan, D. Kalita, P. Simone, G. L. Emmert, X. Zhao, *Angew. Chem., Int. Ed.* 2012, 51, 1653-1656.

[5] a) A. M. Appel, D. L. DuBois, M. R. DuBois, *J. Am. Chem. Soc.* 2005, 127, 12717-12726; b) H. I. Karunadasa, C. J. Chang, J. R. Long, *Nature* 2010, 464, 1329-1333.

[6] a) H. Ozawa, M. Haga, K. Sakai, *J. Am. Chem. Soc.* 2006, 128, 4926-4927; b) T. Lazarides, T. McCormick, P. Du, G. Luo, B. Lindley, R. Eisenberg, *J. Am. Chem. Soc.* 2009, 131, 9192-9194; c) P. Zhang, M. Wang, J. Dong, X. Li, F. Wang, L. Wu, L. Sun, *J. Phys. Chem. C* 2010, 114, 15868-15874; d) A. Fihri, V. Artero, M. Razavet, C. Baffert, W. Leibl, M. Fontecave, *Angew. Chem., Int. Ed.* 2008, 47, 564-567; e) D. Streich, Y. Astuti, M. Orlandi, L. Schwartz, R. Lomoth, L. Hammarström, S. Ott, *Chem.-Eur. J.* 2010, 16, 60-63; f) J. L. Dempsey, J. R. Winkler, H. B. Gray, *J. Am. Chem. Soc.* 2009, 132, 1060-1065; g) T. M. McCormick, B. D. Calitree, A. Orchard, N. D. Kraut, F. V. Bright, M. R. Detty, R. Eisenberg, *J. Am. Chem. Soc.* 2010, 132, 15480-15483; h) B. Probst, A. Rodenberg, M. Guttentag, P. Hamm, R. Alberto, *Inorg. Chem.* 2010, 49, 6453-6460; i) F. Gaertner, B. Sundararaju, A.-E. Surkus, A. Boddien, B. Loges, H. Junge, P. H. Dixneuf, M. Beller, *Angew. Chem., Int. Ed.* 2009, 48, 9962-9965; j) C. V. Krishnan, N. Sutin, *J. Am. Chem. Soc.* 1981, 103, 2141-2142.

[7] B. D. Stubbert, J. C. Peters, H. B. Gray, *J. Am. Chem. Soc.* 2011, 133, 18070-18073.

[8] B. Radaram, J. A. Ivie, R. M. Grudzien, J. H. Reibenspies, C. E. Webster, X. Zhao, *Inorg. Chem.* 2011, 50, 10564-10571.

[9] A. Bencini, C. Benelli, D. Gatteschi, C. Zanchini, *Inorg. Chem.* 1980, 19, 3027-3030.

[10] a) B. Probst, C. Kolano, P. Hamm, R. Alberto, *Inorg. Chem.* 2009, 48, 1836-1843; b) K. L. Mulfort, D. M. Tiede, *J. Phys. Chem. B* 2010, 114, 14572-14581.

[11] a) B. H. Solis, S. Hammes-Schiffer, *Inorg. Chem.* 2011, 50, 11252-11262; b) B. H. Solis, S. Hammes-Schiffer, *J. Am. Chem. Soc.* 2011, 133, 19036-19039.

[12] U. Koelle, S. Paul, *Inorg. Chem.* 1986, 25, 2689-2694.

[13] a) C. Creutz, N. Sutin, B. S. Brunschwig, *J. Am. Chem. Soc.* 1979, 101, 1297-1298; b) J. L. Dempsey, J. R. Winkler, H. B. Gray, *J. Am. Chem. Soc.* 2010, 132, 16774-16776.

We claim:

1. A metal complex of formula (I):

$$[M(G)Y]_m(X)_n(L)_a \quad (I)$$

wherein
- M is a transition metal;
- G is N,N-bis((isoquinolin-1-yl)methyl)(6-(pyridin-2-yl)pyridin-2-yl)methanamine (DIQ-Bpy);
- Y, for each occurrence, independently is a halogen group or a water moiety;
- X, for each occurrence, independently is an anion;
- m is the number of cations per metal complex;
- n is the number of anions per metal complex;
- L is absent or a neutral molecule; and
- a is the number of neutral molecules per metal complex.

2. The metal complex of claim 1, wherein said metal is cobalt.

3. The metal complex of claim 2, wherein Y is chloride.

4. The cobalt complex of claim 3, wherein a is 0; and X is Cl⁻.

5. A metal complex of formula (III):

$$[M(G)Y]_m(X)_n(L)_a \quad (III)$$

or a salt, solvate or hydrate thereof;
wherein
- M is a transition metal;
- G is 6'-((bis(pyridin-2-ylmethyl)amino)methyl)-N,N-dimethyl-2,2'-bipyridin-6-amine ("DPA-ABpy"), or N,N-bis((isoquinolin-1-yl)methyl)(6-(pyridin-2-yl)pyridin-2-yl)methanamine (DIQ-Bpy);
- Y, for each occurrence, independently is absent, a halogen group or a water moiety;
- X, for each occurrence, independently is an anion;
- m is the number of cations per metal complex;
- n is the number of anions per metal complex;
- L is absent or a neutral molecule; and
- a is the number of neutral molecules per metal complex.

6. The metal complex of claim 5, wherein M is Co, Ru, Ni, or Fe.

7. The metal complex of claim 6, wherein G is DPA-ABpy.

8. The metal complex of claim 6, wherein Y is absent or a water moiety.

9. The metal complex of claim 6, wherein said metal complex is [Ni(DPA-ABpy)(OH$_2$)](BF$_4$)$_2$ or [Co(DPA-ABpy)](PF$_6$)$_2$, or a salt, solvate or hydrate thereof.

10. A catalyst comprising a metal complex of claim 1.

11. A process for producing hydrogen from an aqueous solution comprising a step of adding a catalyst of claim 10 to said aqueous solution.

12. The process of claim 11, further comprising a step of carrying out electrolysis or photolysis on the aqueous solution containing the catalyst.

13. The process of claim 12, wherein said aqueous solution comprises ascorbic acid.

14. The process of claim 11, wherein said catalyst comprises [Ni(DPA-ABpy)(OH$_2$)](BF$_4$), or [Co(DPA-ABpy)](PF$_6$)$_2$.

15. The metal complex of claim 1, wherein G is N,N-bis((isoquinolin-1-yl)methyl)(6-(pyridin-2-yl)pyridin-2-yl)methanamine (DIQ-Bpy).

16. N,N-bis((isoquinolin-1-yl)methyl)(6-(pyridin-2-yl)pyridin-2-yl)methanamine.

17. A metal complex comprising N,N-bis((isoquinolin-1-yl)methyl)(6-(pyridin-2-yl)pyridin-2-yl)methanamine, and a transition metal; or a salt, solvate, or hydrate thereof.

18. The metal complex of claim 17, wherein the transition metal is Co, Ru, Ni, or Fe.

19. The metal complex of claim 17, wherein the complex further comprises an anion.

20. The complex of claim 17, wherein the complex is [Ru(DIQ-Bpy)(Cl)](PF$_6$).

* * * * *